United States Patent [19]

Oritsuki et al.

[11] Patent Number: 5,555,112
[45] Date of Patent: Sep. 10, 1996

[54] LIQUID CRYSTAL DISPLAY DEVICE HAVING MULTILAYER GATE BUSLINE COMPOSED OF METAL OXIDE AND SEMICONDUCTOR

[75] Inventors: Ryoji Oritsuki; Minoru Hiroshima, both of Chiba-ken; Masahiro Yanai, Mobara; Masaaki Matsuda, Mobara; Toshikazu Horii, Mobara; Yuichi Hashimoto, Mobara; Hayao Kozai, Mobara; Kenkichi Suzuki, Mobara; Masaru Takabatake, Hitachi; Takashi Isoda, Mobara, all of Japan

[73] Assignees: Hitachi, Ltd., Tokyo; Hitachi Device Engineering Co., Ltd., Chiba-ken, both of Japan

[21] Appl. No.: 193,868

[22] Filed: Feb. 9, 1994

[30] Foreign Application Priority Data

Feb. 23, 1993 [JP] Japan .................................. 5-33370

[51] Int. Cl.[6] .......................... G02F 1/1343; H01L 29/04
[52] U.S. Cl. .............................. 359/59; 359/54; 257/59; 257/72
[58] Field of Search .............................. 257/59, 72, 508, 257/748, 758; 359/59, 54

[56] References Cited

U.S. PATENT DOCUMENTS

| | | | |
|---|---|---|---|
| 5,151,688 | 9/1992 | Tanaka et al. | 359/59 |
| 5,177,577 | 1/1993 | Taniguchi et al. | 257/72 |
| 5,234,541 | 8/1993 | Shannon et al. | 359/62 |
| 5,245,450 | 9/1993 | Ukai et al. | 359/59 |
| 5,285,301 | 2/1994 | Shirahashi et al. | 359/54 |
| 5,334,859 | 8/1994 | Matsuda | 257/72 |

*Primary Examiner*—Rolf Hille
*Assistant Examiner*—Fetsum Abraham
*Attorney, Agent, or Firm*—Antonelli, Terry, Stout & Kraus

[57] ABSTRACT

In a liquid crystal display substrate in which the pixel electrode is applied with a voltage through the drain and source of a thin-film transistor (TFT) that conducts by a voltage applied to the TFT gate electrode, this gate electrode and a busline connected to the gate electrode are formed as a multi-layered structure consisting of a gate layer and at least two layers of a gate insulation film and an amorphous silicon film. The multi-layered structure is formed by etching through a single mask.

19 Claims, 28 Drawing Sheets

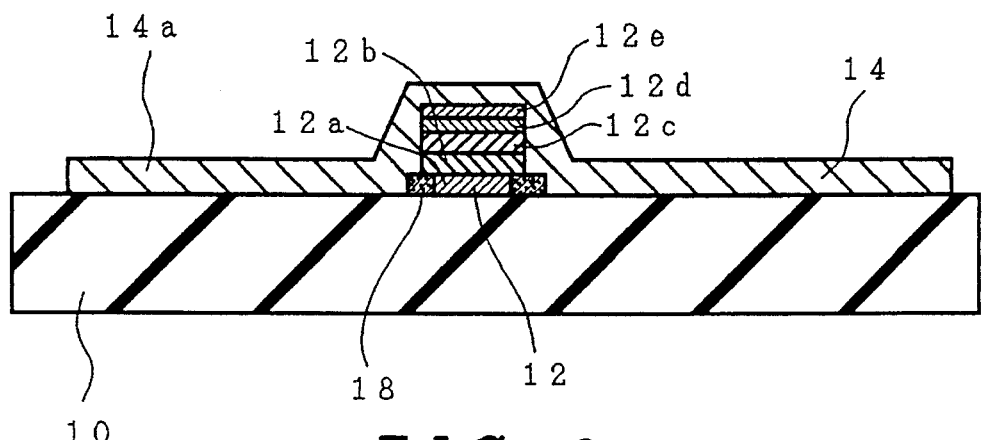

FIG. 2

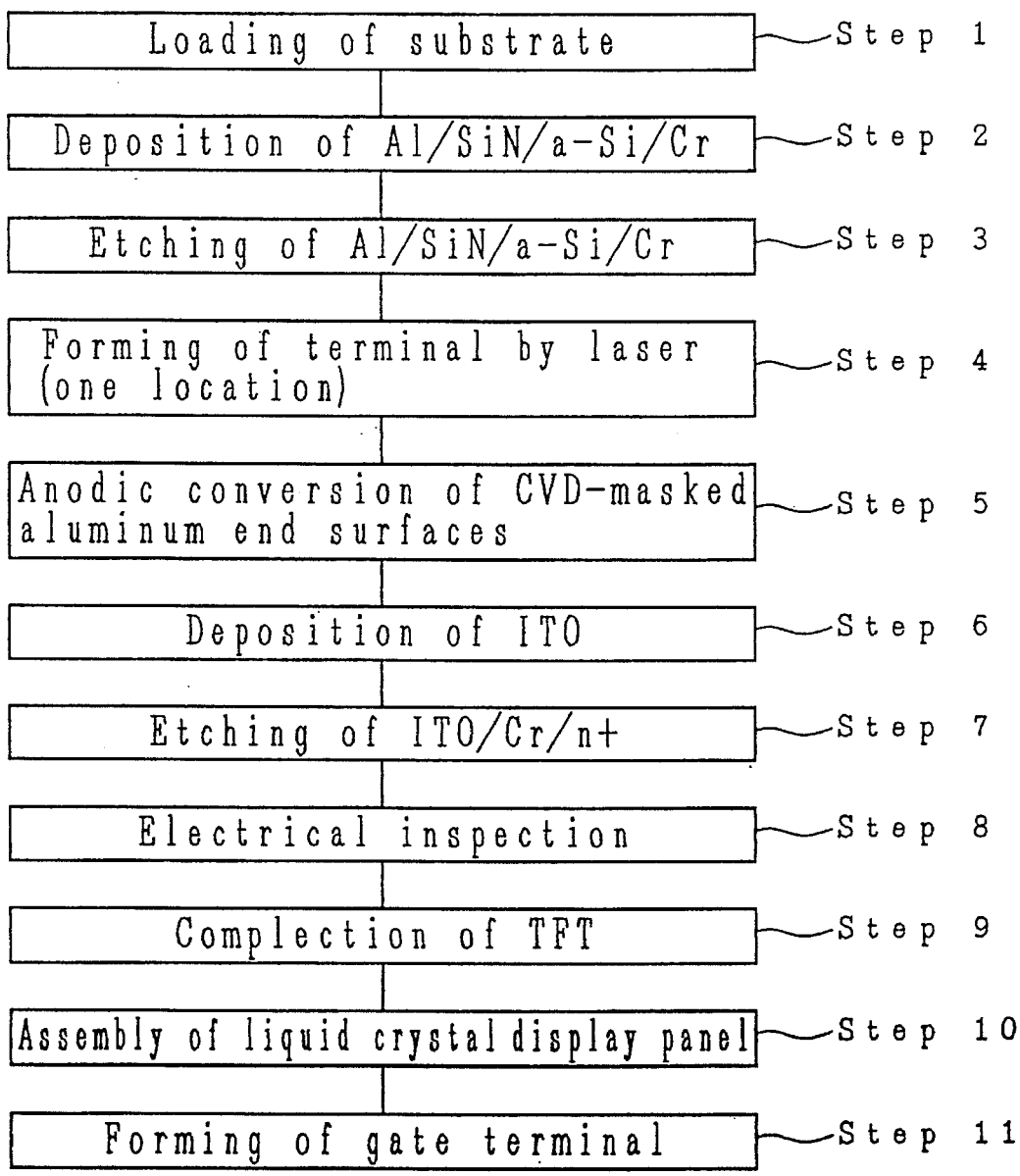

FIG. 3

| | |
|---|---|
| Loading of substrate | Step 1 |
| Deposition of Al/SiN/a-Si/Cr | Step 2 |
| Etching of Al/SiN/a-Si/Cr | Step 3 |
| Forming of terminal by laser (one location) | Step 4 |
| Anodic conversion of CVD-masked aluminum end surfaces | Step 5 |
| Deposition of ITO | Step 6 |
| Etching of ITO/Cr/n+ | Step 7 |
| Electrical inspection | Step 8 |
| Completion of TFT | Step 9 |
| Assembly of liquid crystal display panel | Step 10 |
| Forming of gate terminal | Step 11 |

- Loading of substrate — Step 1
- Deposition of Al/SiN/a-Si/Cr — Step 2
- Etching of Al/SiN/a-Si/Cr — Step 3
- Application of organic end surface protection film — Step 4
- Post-baking — Step 5
- Etch-back — Step 6
- Deposition of ITO — Step 7
- Etching of ITO/Cr/n+ — Step 8
- Electrical inspection — Step 9
- Completion of TFT — Step 10
- Assembly of liquid crystal display panel — Step 11
- Forming of gate terminal — Step 12

FIG. 30

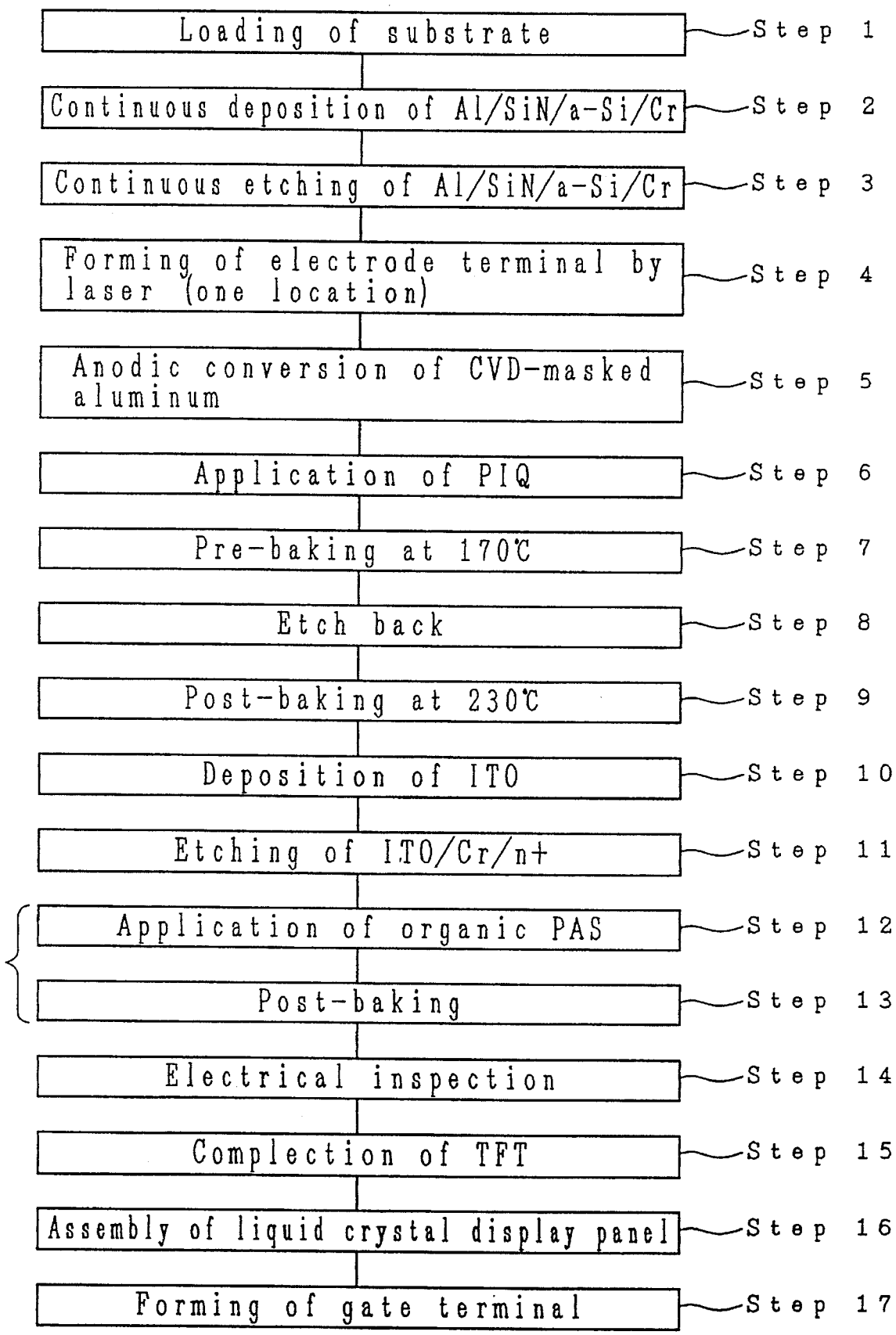

- Step 1: Loading of substrate
- Step 2: Continuous deposition of Al/SiN/a-Si/Cr
- Step 3: Continuous etching of Al/SiN/a-Si/Cr
- Step 4: Forming of electrode terminal by laser (one location)
- Step 5: Anodic conversion of CVD-masked aluminum
- Step 6: Application of PIQ
- Step 7: Pre-baking at 170°C
- Step 8: Etch back
- Step 9: Post-baking at 230°C
- Step 10: Deposition of ITO
- Step 11: Etching of ITO/Cr/n+
- Step 12: Application of organic PAS
- Step 13: Post-baking
- Step 14: Electrical inspection
- Step 15: Completion of TFT
- Step 16: Assembly of liquid crystal display panel
- Step 17: Forming of gate terminal

LIQUID CRYSTAL DISPLAY DEVICE HAVING MULTILAYER GATE BUSLINE COMPOSED OF METAL OXIDE AND SEMICONDUCTOR

BACKGROUND OF THE INVENTION

1. Field of the Invention

The present invention relates to a liquid crystal display substrate and a method of manufacturing it and more specifically to a liquid crystal display substrate incorporating thin-film transistors, which serve as switching elements, and a method of manufacture thereof.

2. Description of the Prior Arts

A so-called active matrix type liquid crystal display substrate has nonlinear elements (switching elements) provided in one-to-one correspondence to a plurality of pixel electrodes arranged in the form of a matrix. The liquid crystal at each pixel is theoretically driven at all times (duty ratio of 1.0), so that the active type has better contrast than a so-called simple matrix type that adopts a time-division driving method. The active matrix type liquid crystal display substrate is becoming an essential technology particularly for color liquid crystal display devices. A representative switching element is a thin-film transistor (TFT).

The thin-film transistor consists of: a gate, a gate insulating film and a silicon layer such as an amorphous silicon (a-Si) layer or polysilicon (p-Si) layer, all formed successively on the surface of a transparent substrate in which pixel electrodes are formed; and a drain electrode and a source electrode, both deposited on the silicon layer and formed integral with an interconnect layer or busline that supplies voltage and also with pixel electrodes.

The liquid crystal display substrate of the active matrix type using the thin-film transistors is known and introduced in such publications as Japanese Patent Laid-Open No. 309921/1988 and an article entitled "12.5-type Active Matrix Color Liquid Crystal Display Using Redundant Configuration" in Nikkei Electronics, page 193–210, Dec. 15, 1986, published by Nikkei McGraw-Hill.

SUMMARY OF THE INVENTION

Problem to Be Solved by the Invention

The thin-film transistor of the above configuration used in the liquid crystal display substrate, however, has a problem that because the gate, the gate insulating film and the silicon layer are produced separately in specified patterns by using the known photoetching technique, a number of manufacturing processes are required.

The present invention has been accomplished against this background and its objective is to provide a liquid crystal display substrate capable of reducing the number of manufacturing steps substantially.

Means to Solve the Problem

To achieve the above objective, the present invention provides a liquid crystal display substrate, which basically comprises:

pixel electrodes;

thin-film transistors, each having a gate electrode, a drain and a source, the gate electrode being applied with a voltage to impress a voltage on the associated pixel electrode through the drain and source of the thin-film transistor; and interconnect layers or buslines connected to the gate electrodes of the thin-film transistors;

wherein the gate electrode of the thin-film transistor and the busline are formed as a multi-layered structure which includes a gate layer and at least two layers of a gate insulation film and a silicon film, and which is etched by using a single mask.

Workings

In the liquid crystal display substrate of such a construction, a multi-layered structure formed on one of the transparent substrates consists of, from the substrate toward the top, a gate layer, a gate insulation film, a silicon layer and a contact layer or etch-stop film successively deposited in that order. This laminated layer structure is etched by using a single mask to pattern gate buslines in which thin-film transistors are formed at the same time.

This significantly reduces the number of manufacturing steps from that required by the conventional method which performs selective etching separately for each of the gate layer, gate insulation film and silicon film.

BRIEF DESCRIPTION OF THE DRAWINGS

FIG. 2 is a cross section taken along the line A–A' of FIG. 1.

FIG. 3 is a process showing one embodiment of the method of manufacturing the liquid crystal display substrate according this invention.

FIG. 30 is a process showing a further embodiment of the method of manufacturing the liquid crystal display substrate according to this invention.

DETAILED DESCRIPTION OF THE PREFERRED EMBODIMENTS

This invention will be described in conjunction with example embodiments of the liquid crystal display substrate. Figures for each embodiment show the configuration of the pixel electrode and its associated circuit for each pixel formed in one of the paired liquid crystal display substrates.

Embodiment 1

Structure

Figure 1:
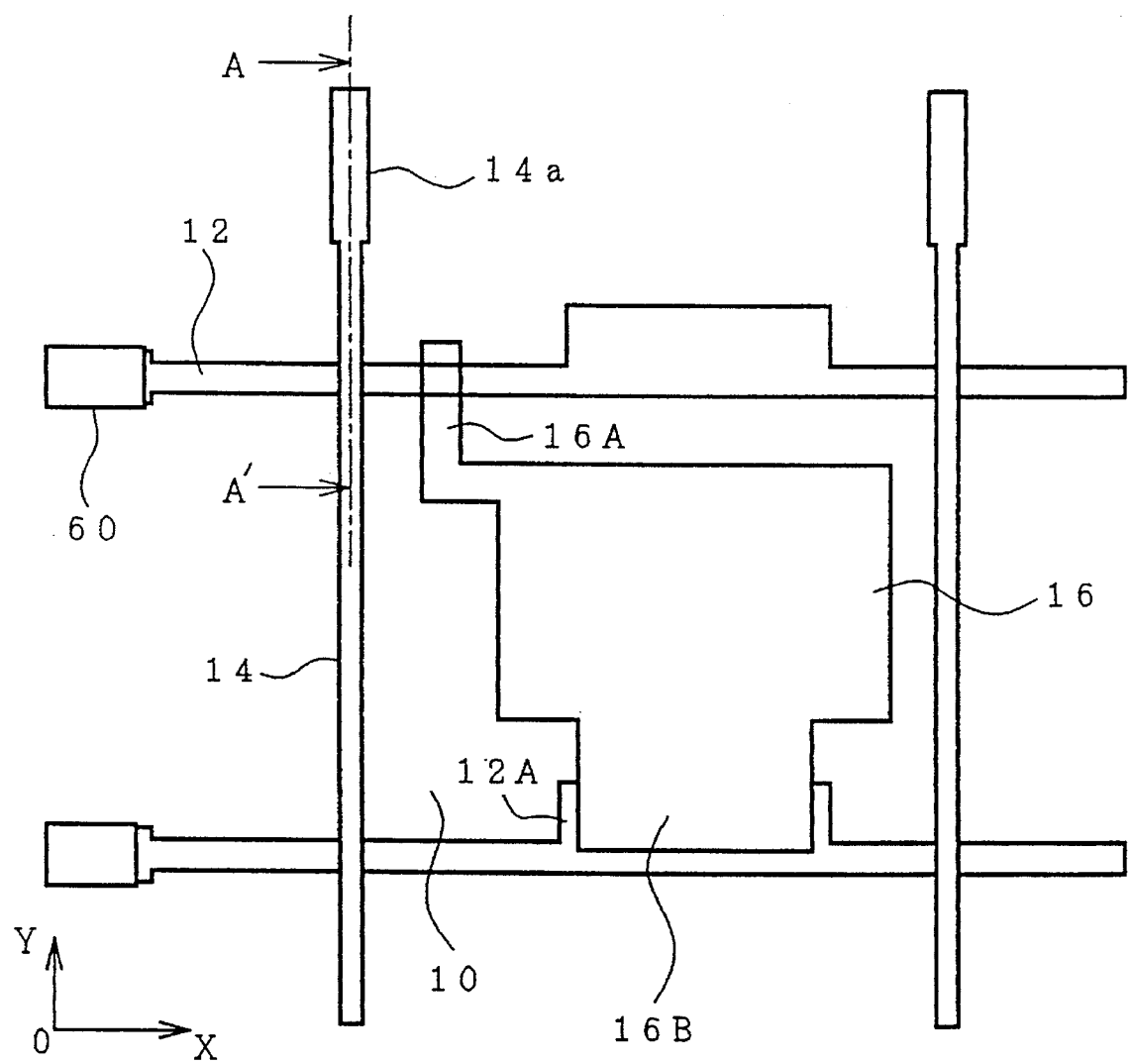
FIG. 1 is a top plan view showing one embodiment of the liquid crystal display substrate according to this invention.

FIG. 1 shows the configuration of the surface of a transparent substrate, one of the paired liquid crystal display substrates, according to this invention. FIG. 2 is a cross section taken along the line A–A' of FIG. 1.

Referring to FIG. 1, gate buslines 12 running in the x direction on the principal plane of a glass substrate 10 on the side of a liquid crystal not shown are arranged parallelly in the y direction.

The gate busline 12 has a multi-layer structure, as shown in FIG. 2, which consists of, starting from the glass substrate 10 side, an aluminum layer 12a, silicon nitride (SiN) film 12b, and amorphous silicon (a-Si) layer 12c. Where it is straddled by an ITO drain 14 and an ITO pixel 16, both described later, the gate busline 12 also has on the surface of the a-Si layer 12c an n(+) layer 12d and Cr layer 12e, which are doped with highly concentrated n-type impurities.

The Cr layer 12e and the underlying n(+) layer 12d are provided as contact layers. The Cr layer 12e is the one to make the contact reliable and it is also possible to provide only the highly doped n layer 12d.

The multi-layered gate busline 12 then has the side wall surfaces of its aluminum layer 12a oxidized to form an alumina conversion film 18, for example, with the result that the aluminum layer 12a is covered with an insulating film around its periphery.

The aluminum layer 12a is not limited in the constituent material to aluminum but may use other metals. For example, it may be formed as an Al and Si layer, Ta (tantalum) layer, Ti (titanium) layer, Cu (copper) layer or Pd (palladium) layer, or a layer of nitrides such as TaN and TiN. It may also take a laminated structure made up of these layers. In these cases, the side walls of the gate busline are subjected to anodic conversion to form oxides of these metals.

ITO drains 14, another interconnect layers or buslines separate from these gate buslines 12, extend in the y direction in the figure and are arranged side by side in the x direction.

The ITO drain 14 is formed of a transparent ITO film and straddles the gate buslines 12. As a result, the ITO drain 14 is electrically connected to the Cr layer 12e, the top layer of the gate busline 12, and is isolated from the aluminum layer 12a by the alumina converted film 18 mentioned above.

In rectangular regions enclosed by the gate buslines 12 and the ITO drains 14, an ITO electrode 16 which constitutes the pixel electrode is formed on the surface of the glass substrate 10. A portion 16A of the ITO electrode 16 extends to and straddles one of the gate buslines 12, which is upper one in the figure. In this case, too, the portion 16A of the ITO electrode 16 is electrically connected with the Cr layer 12e, the top layer of the gate busline 12, and is isolated from the aluminum layer 12a.

The portion 16A of the ITO electrode 16 is formed parallel to and close to one of the ITO drains 14 which is situated on the left side in the figure. The thin-film transistor (TFT) is incorporated in the gate busline 12 between the ITO drain 14 on the left side and the portion 16A.

That is, the TFT transistor uses the ITO drain as its drain and the portion 16A of the ITO electrode 16 as its source. The drain and source of the TFT conduct by the application of a voltage to the aluminum layer 12a through the SiN film 12b because the voltage application forms a channel layer in the a-Si layer 12c.

The ITO electrode 16 has another portion 16B extending to the lower gate busline 12 where it overlaps a relatively wide area of an expanded portion 12A of the gate busline 12 which is formed by increasing the width of a part of the gate busline 12. This overlapping area forms a holding capacitance between the portion 16B of the ITO electrode 16 and the aluminum layer 12a of the gate bus line 12.

Method of Manufacture

One example method of manufacturing the liquid crystal display substrate of the above construction will be explained by referring to FIG. 3.

Process 1 (in the figure, step 1 and step 2)

A glass substrate 10 is prepared. On the side in contact with the liquid crystal, the glass substrate 10 has the entire area of its surface deposited first with the aluminum layer 12a to the thickness of 120 nm, then the SiN film 12b to 400 nm and then the a-Si 12c layer to 230 nm. The surface of the a-Si film 12c is doped with a high concentration of n-type impurity to form an n(+) layer 12d.

The Cr layer 12e is then formed on top of the n(+) layer 12d. These layers can be formed continuously in a vacuum vessel, for example, without breaking the vacuum.

Process 2 (step 3)

The multi-layered structure formed in the process 1 is selectively photoetched away to form the gate buslines 12 in a pattern shown in FIG. 1.

Process 3 (step 4)

A laser beam is locally radiated where the gate buslines 12 are to be commonly connected, in order to remove the Cr layer 12e, n(+) layer 12d, a-Si layer 12c and SiN film 12b to expose the lowermost layer of aluminum 12a.

Figure 4:
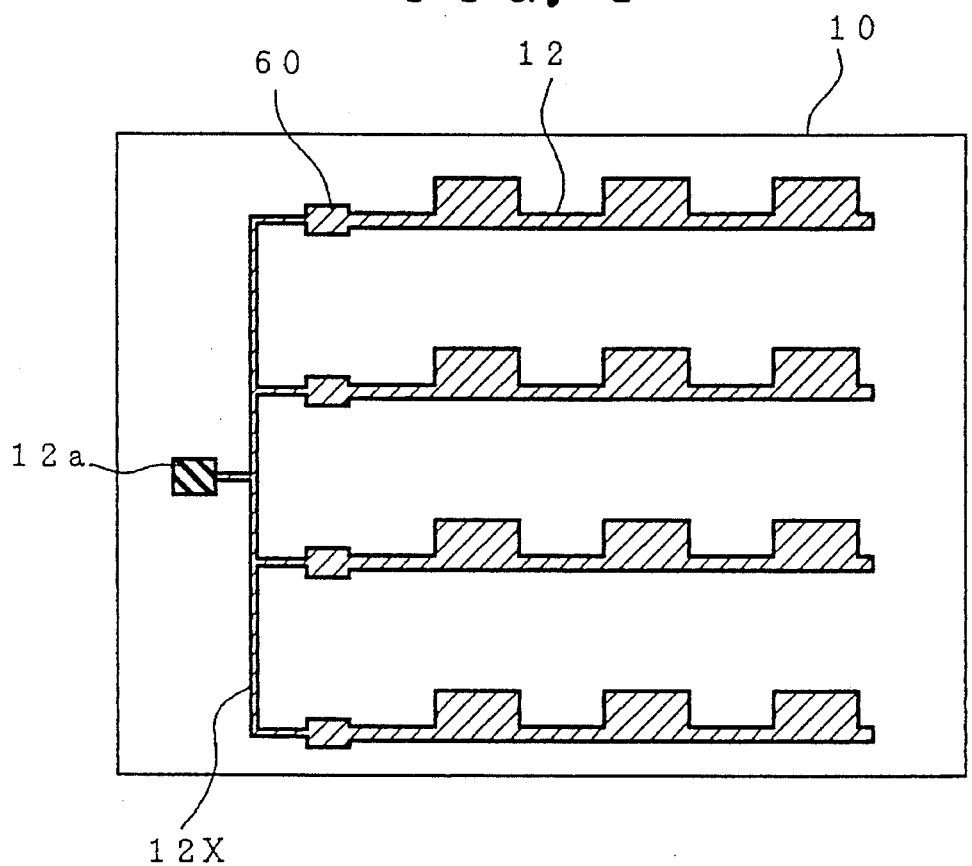
FIG. 4 is a plan view showing one embodiment of the liquid crystal display substrate before being subjected to the anodic conversion in the process of manufacturing the liquid crystal display substrate according this invention.

FIG. 4 shows a plan view of the gate buslines 12 formed over the entire surface of the glass substrate 10. These gate buslines 12 are shown to be commonly connected by the bus line 12X, which will be removed later. The figure also shows the exposed lowermost aluminum layer 12a outside the effective display region.

Figure 6:
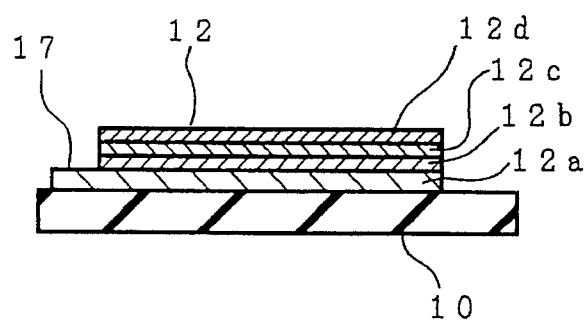
FIG. 6 is an cross section of the substrate at one point in the process of manufacturing the liquid crystal display substrate according to this invention.

FIG. 6 is a cross section of the gate busline 12 with the aluminum layer 12a exposed. The aluminum layer 12a may also be exposed by ordinary photoetching rather than using the laser beam.

Process 4 (step 5)

With the exposed aluminum layer 12a used as one of the electrodes, an anodic conversion is performed on the aluminum layer 12a exposed at the side wall surfaces of the multi-layered structure to form an alumina conversion film 18 that isolates the layer.

Figure 5:
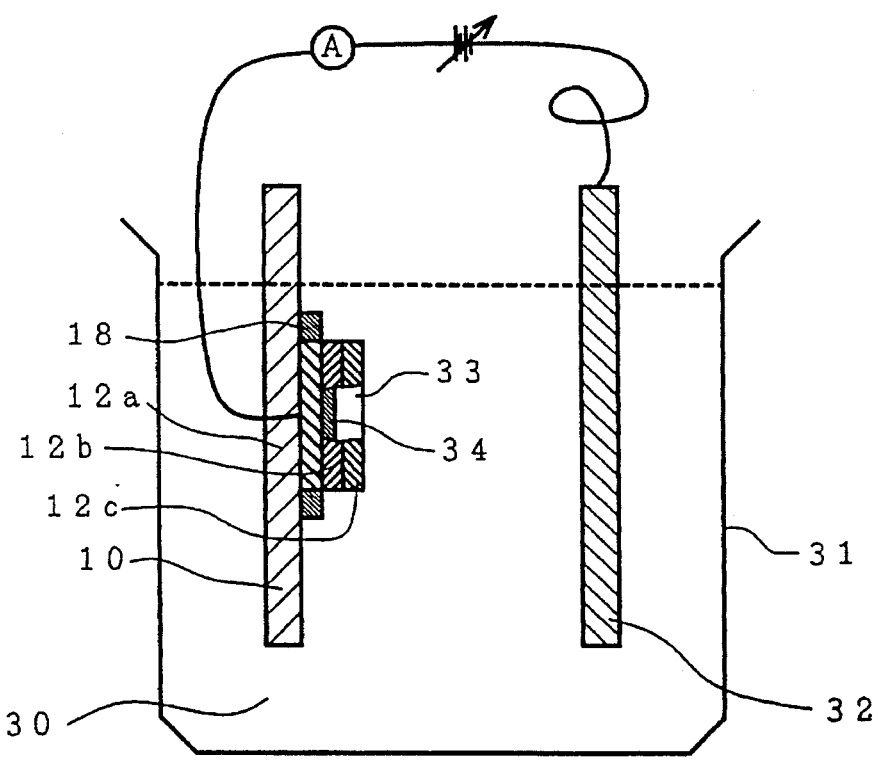
FIG. 5 is an explanatory view showing one embodiment of the anodic conversion in the process of manufacturing the liquid crystal display substrate according to this invention.

FIG. 5 shows how the alumina conversion film is made by the anodic conversion process. In the figure, the glass substrate 10 processed as described above and a platinum electrode 32 are immersed, facing each other, in an anodic oxidizing liquid 30 contained in a vessel 31. A voltage is applied between these electrodes, with the platinum electrode 32 on the minus side and the aluminum layer 12a of the glass substrate 10 on the plus side.

As a result, the alumina conversion film 18 is formed over the exposed surfaces of the aluminum layer 12a in contact with the anodic oxidizing liquid 30, i.e. over the surfaces of the aluminum layer 12a exposed at the side walls of the multi-layered gate busline 12.

This process has the advantage that if there are so-called flaked defects at the upper surface, not the side wall surfaces, of the gate busline 12 exposing the aluminum layer 12a, the alumina conversion film is also formed over the exposed areas to repair the flaked defects.

Process 5 (step 6)

The principal surface of the glass substrate 10 processed thus far is formed over its entire area with an ITO film.

Process 6 (step 7)

The ITO film is selectively photoetched away to form the ITO drains 14 in a pattern shown in FIG. 1.

At the same time, the Cr layer 12e and n(+) layer 12d formed on the top surface of the gate busline 12 are also etched away by using the same mask. As a result, the Cr layer 12e and n(+) layer 12d, which constitute the contact layers, are formed only at intersections between the gate bus lines 12 and the ITO drains 14, so that they can serve as contact layers.

Process 7 (step 8)

An electrical inspection is carried out to see if the gate buslines 12, ITO drains 14, TFTs, etc. operate normally.

Process 8 (step 9)

When they are found normal, the manufacture conducted so far is deemed completed.

Process 9 (step 10)

Another glass substrate (upper substrate) prepared beforehand and having common electrodes formed thereon is arranged facing the first glass substrate 10 (lower substrate) with a sealant disposed therebetween. Then liquid crystal is charged into the space between the facing glass substrates.

Process 10 (step 11)

The gate bus line terminals are drawn out. Now the whole manufacturing process is completed. At the stage after the preceding Process 9 (step 10), the gate terminals of FIG. 1 consist of, from the glass substrate 10 toward the top, the aluminum layer 12a, SiN film 12b, and a-Si layer 12c. The last process (step 11) uses the lower substrate as a mask to remove the SiN film 12b and a-Si layer 12c to provide the gate terminals made of aluminum layer 12a. In this last process, removal of the layers may be done by the laser beam as in the preceding processes.

Figure 7:
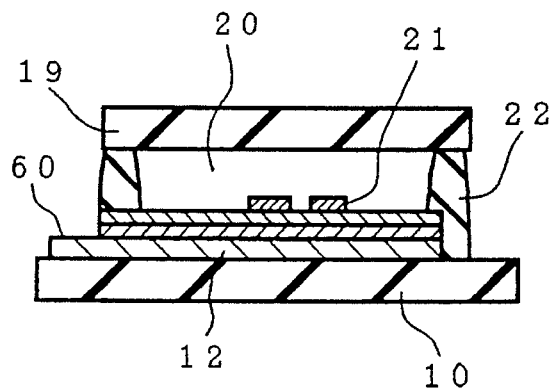
FIG. 7 is a cross section of the substrate at the completion of the process of manufacturing the liquid crystal display substrate according to this invention.

FIG. 7 shows a cross section of the liquid crystal display substrate assembled by the above process.

In the liquid crystal display substrate of the Embodiment 1 with the above construction, the process of forming the gate buslines 12 by etching the multi-layered structure—which is made up of, from the glass substrate toward the top, the aluminum layer 12a, SiN film 12b, a-Si layer 12c and contact layers (n(+) layer 12d and Cr layer 12e)—by using a single mask can also incorporate the TFTs in the gate buslines 12 at the same time.

This significantly reduces the number of manufacturing steps in making such a construction.

Then, the ITO drains 14 and the ITO pixels 16 are formed simultaneously in a pattern shown in FIG. 1. And the Cr layer 12e and the underlying n(+) layer 12d, both formed on top of the gate buslines 12, are etched away by the same mask to form the drain and source of the TFTs.

As shown in FIG. 7, on the TFT substrate surface, there exists an orientation film, not shown, about 100 nm thick for the orientation of liquid crystal, but normally a final protection film is omitted which is formed of a SiN film with the thickness of about 400 nm to 1000 nm or one to two times the thickness of the drain line. This is explained as follows. Since the drain lines are formed of the ITO material alone, there is no possibility of galvanic corrosion of the drain lines during their service life. Further, because the gate buslines are covered with an insulating material, they will not be affected by galvanic corrosion. Because the gate buslines, while in use, are constantly applied approximately DC –20 V with respect to the common electrode of the upper substrate (not the TFT substrate), they must be covered with an insulating fill to alleviate the DC voltage application to the liquid crystal and thereby prevent stains that would otherwise be caused by the dissolving of the liquid crystal. That is, in the TFT substrate in which the gate buslines are covered with the insulating film and in which the drain lines and pixel electrodes are formed of the ITO material alone, it has been found possible to eliminate the final protection film used for line protection.

Embodiment 2

The gate buslines 12 of the multi-layered structure shown in the Embodiment 1 have their bottom layer made of, say, aluminum gate layer 12a and its side wall surfaces oxidized to electrically isolate it from the ITO drain 14. The insulation structure is not limited to this and may use those shown in FIG. 8 and 9.

Structure

Figure 8:
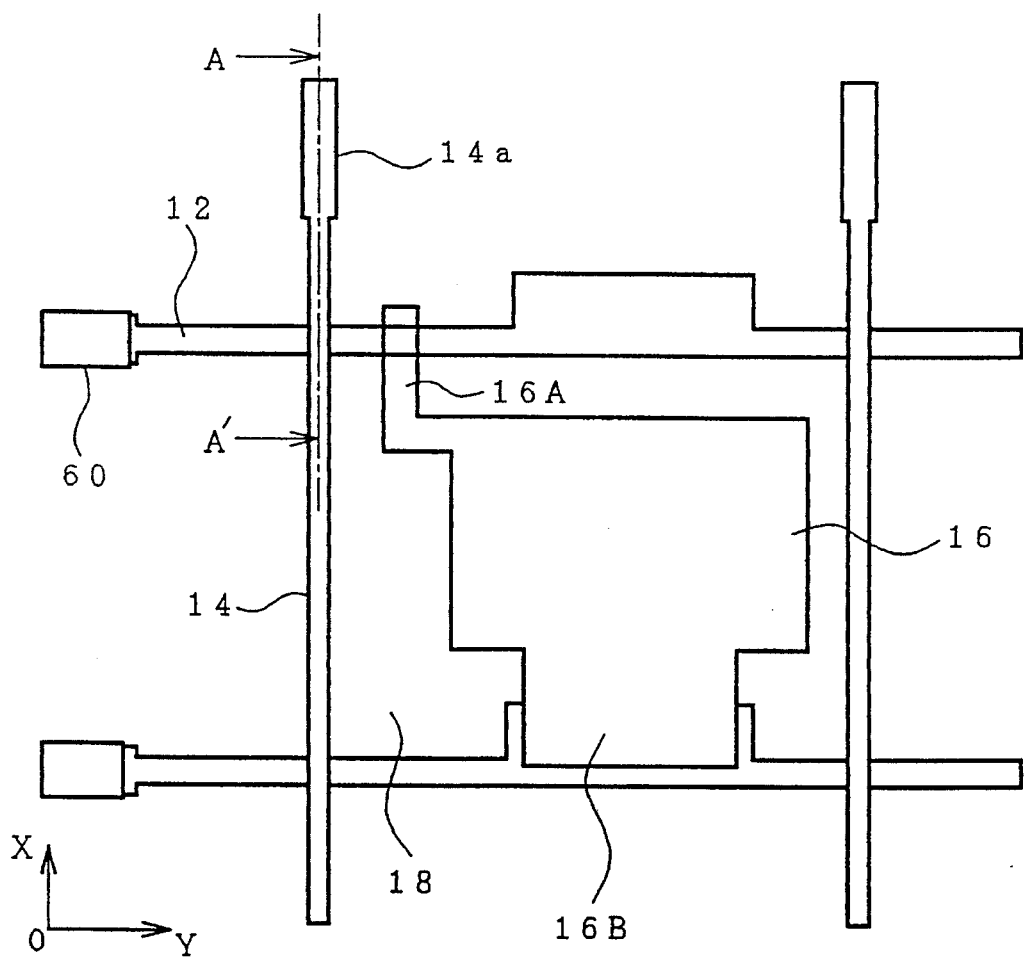
FIG. 8 is a plan view of another embodiment of the liquid crystal display substrate according to this invention.
Figure 9:
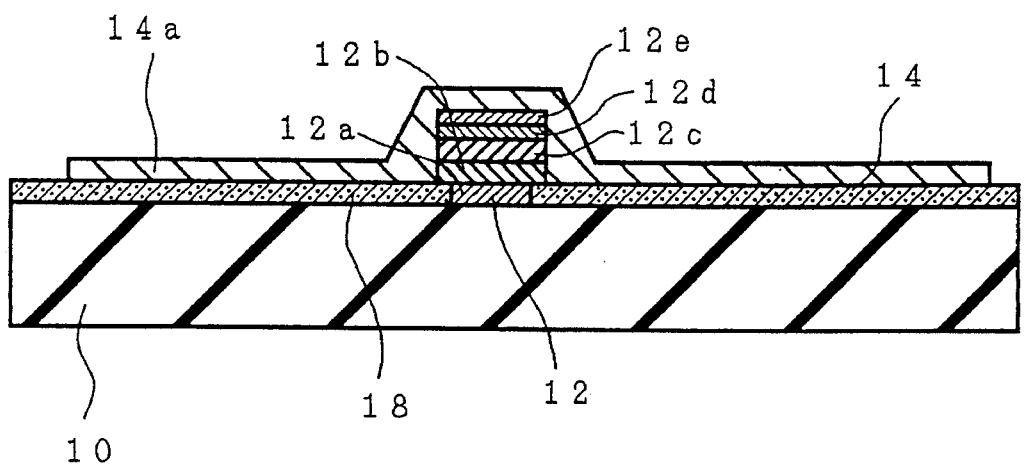
FIG. 9 is a cross section taken along the line A–A' of FIG. 8.

FIG. 8 is a plan view of the substrate and FIG. 9 a cross section taken along the line A–A' of FIG. 8.

As shown in FIG. 8 and 9, on the principal surface of the glass substrate 10, an alumina conversion film 18 is formed over the entire area excluding the gate busline 12 forming regions. The alumina conversion film 18 is formed by oxidizing an aluminum layer that is produced by the same process used for the aluminum layer 12a at the bottom of the gate busline 12.

The alumina conversion film 18 formed over almost the entire surface of the glass substrate 10 is transparent and thus raises no problem for the liquid crystal display.

Method of Manufacture

Figure 10:
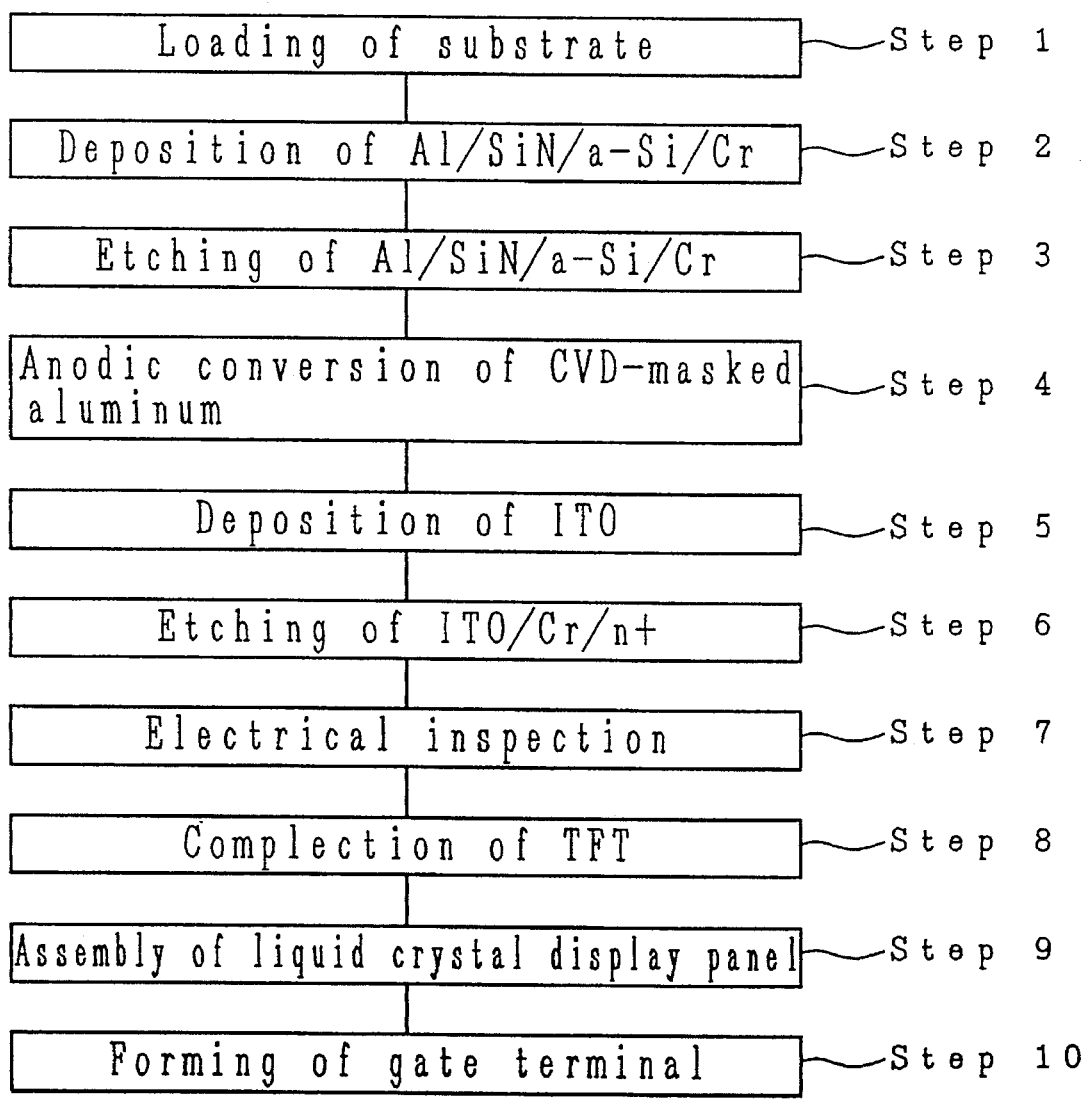
FIG. 10 is another embodiment of the method of manufacturing the liquid crystal display substrate according to this invention.

One example method of manufacturing the liquid crystal display substrate of the above construction will be described by referring to FIG. 10.

Process 1 (step 1, step 2)

A glass substrate 10 is readied. On the side in contact with the liquid crystal, the glass substrate 10 has the entire area of its surface deposited first with an aluminum layer 12a to the thickness of 120 nm, then an SiN film 12b to 400 nm and then an a-Si layer 12c to 230 nm. The surface of the a-Si film 12c is doped with an n-type impurity to form an n(+) layer 12d, which is further deposited with a Cr layer 12e. These layers can be formed continuously in a vacuum vessel, for example, without breaking the vacuum.

Process 2 (step 3)

The multi-layered structure formed in the process 1 is selectively photoetched away to form the gate buslines 12 in a pattern shown in FIG. 8. In this case, the selective removal by photoetch begins with the Cr layer 12e and ends with the SiN film 12b, leaving the aluminum layer 12a as it is at the bottom of the gate busline 12. That is, the aluminum layer 12a is formed over the entire surface of the glass substrate 10, including not only the gate busline forming regions but also other regions.

Figure 12:
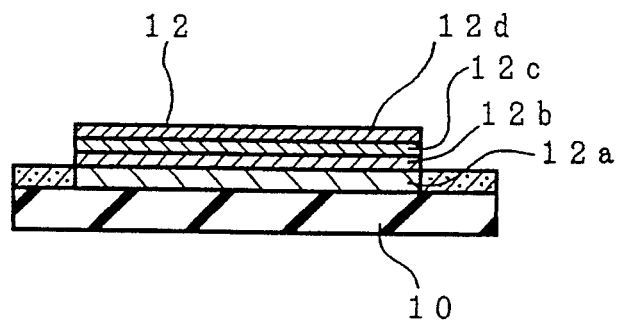
FIG. 12 is a cross section of the substrate at one point in the process of manufacturing the liquid crystal display substrate according to this invention.

FIG. 12 is a cross section taken in the width direction of the gate busline 12.

Process 3 (step 4)

Figure 11:
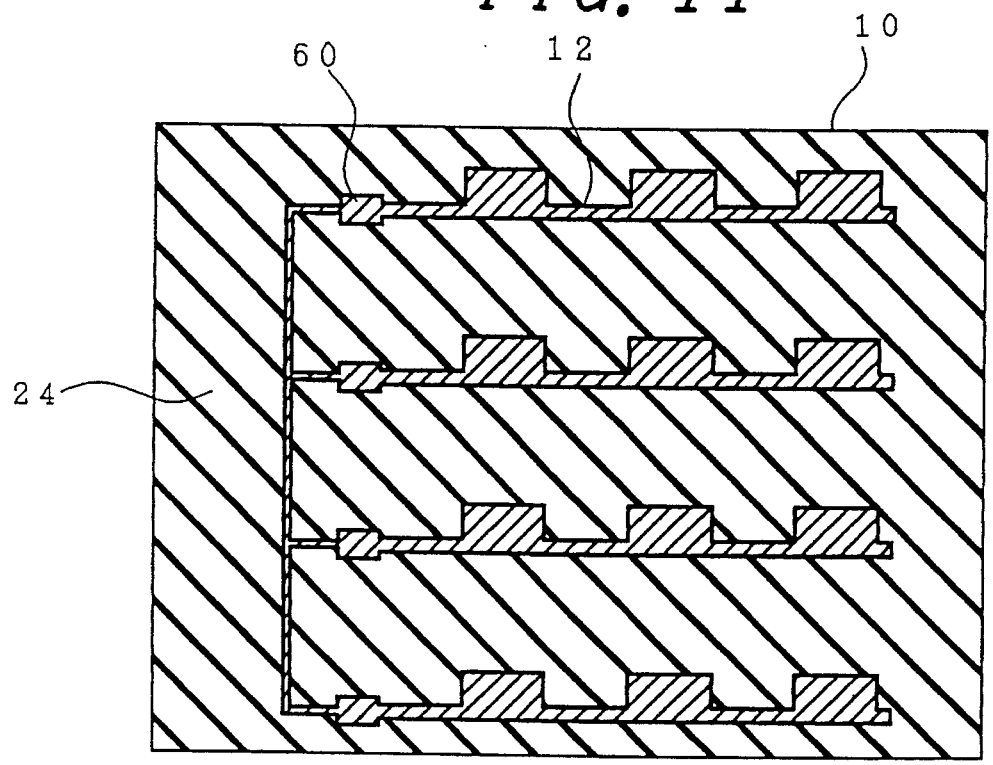
FIG. 11 is a plan view of a further embodiment of the liquid crystal display substrate before being subjected to the anodic conversion in the process of manufacturing the liquid crystal display substrate according to this invention.

The glass substrate 10 that has undergone the processes described above has the aluminum layer 12a exposed over its entire surface, as shown in FIG. 11. The exposed aluminum layer 12a is used as an electrode and subjected to the anodic conversion process.

The anodic conversion process is carried out by using the similar procedure to that shown in FIG. 5.

The liquid crystal display substrate is completed by undergoing the subsequent processes—step 5 to step 10—which are the same as those used in the Embodiment 1.

Figure 13:
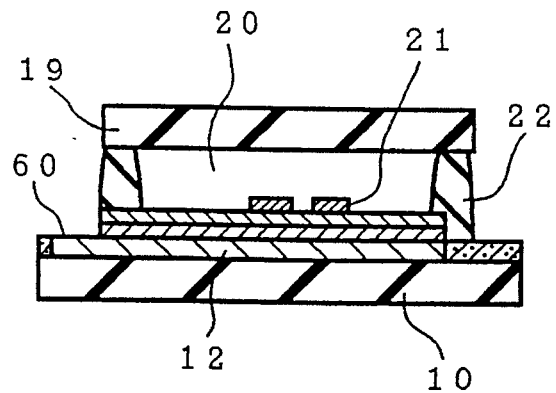
FIG. 13 is a cross section of the substrate at the completion of the process of manufacturing the liquid crystal display substrate according to this invention.

The cross section of the completed liquid crystal display substrate is shown in FIG. 13.

In this second embodiment also, the selective etching using a single mask enables the TFTs to be incorporated in the gate buslines 12 at the same time that the gate bus lines 12 are formed.

Embodiment 3

In either of the preceding embodiments, the alumina conversion film is formed by the anodic conversion process to avoid electric short-circuit between the ITO drains 14 and the gate buslines 12. It is noted that the electrical isolation structure is not limited to this and may use an organic insulation agent to provide the similar effect, as shown in FIG. 14 and 15.

Structure

Figure 14:
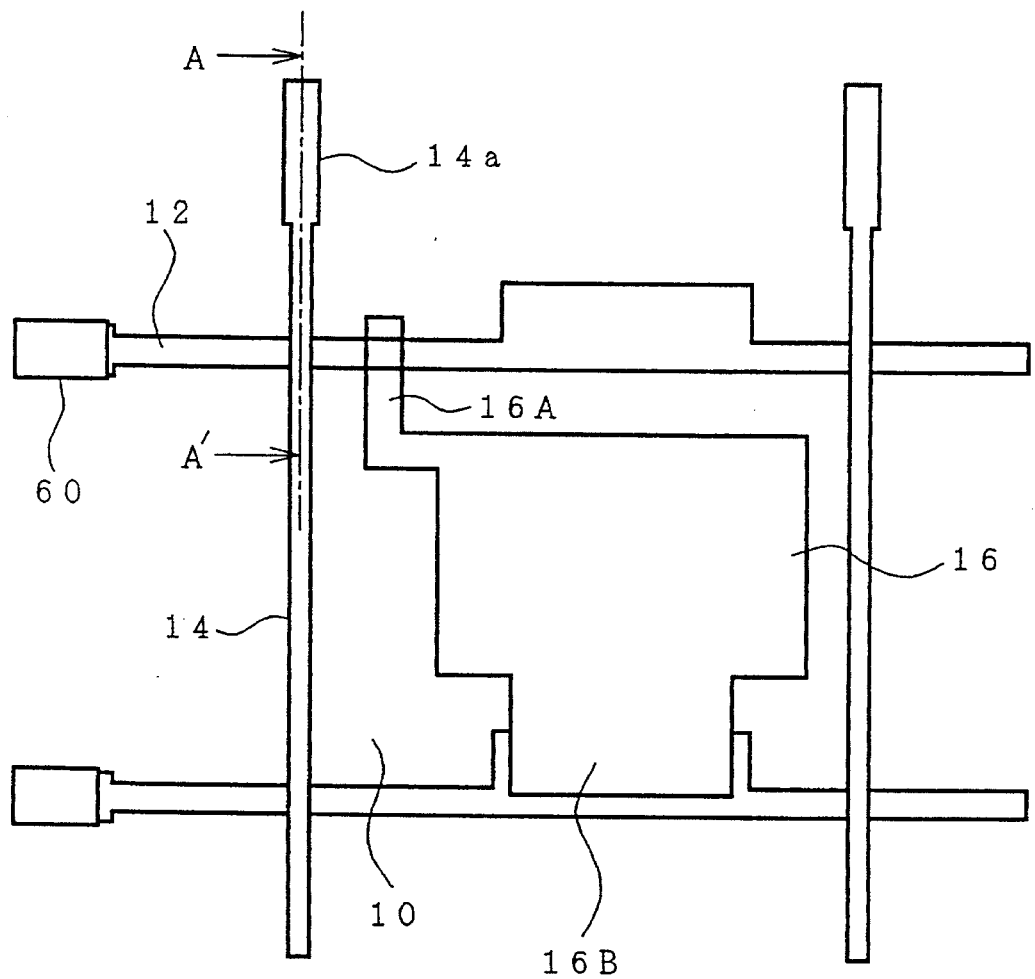
FIG. 14 is a plan view of a further embodiment of the liquid crystal display substrate according to this invention.
Figure 15:
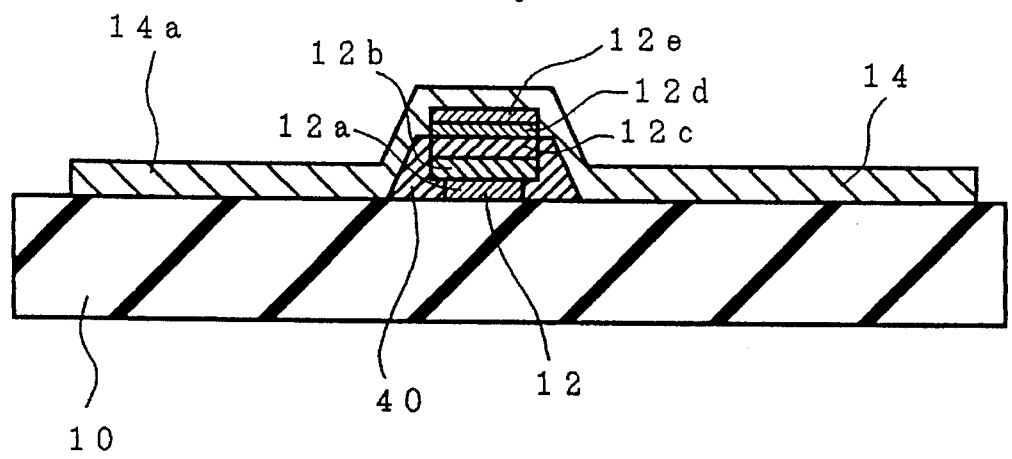
FIG. 15 is a cross section taken along the line A–A' of FIG. 14.

FIG. 14 is a plan view of the substrate and FIG. 15 a cross section taken along the line A–A' of FIG. 14. As shown in FIG. 15, an organic end surface protection film 40 made of organic insulation agent is deposited between the side walls of the gate buslines 12 and the glass substrate 10 surface so as to cover the side walls of the gate buslines 12, each formed as a multi-layered structure of aluminum layer 12a, SiN film 12b, a-Si layer 12c, n(+) layer 12d and Cr layer 12e.

The ITO drain 14 is formed to straddle the gate wire 12 in such a manner as to contact the organic end surface protection film 40 and also make an electrical contact with the Cr layer 12e formed at the top of the gate busline 12.

This structure isolates the aluminum layer 12a of the gate busline 12 from the ITO drain 14 by the organic end surface protection film 40.

Method of Manufacture

One example method of manufacturing the liquid crystal display substrate of the above construction will be described by referring to FIG. 16.

Figure 16:
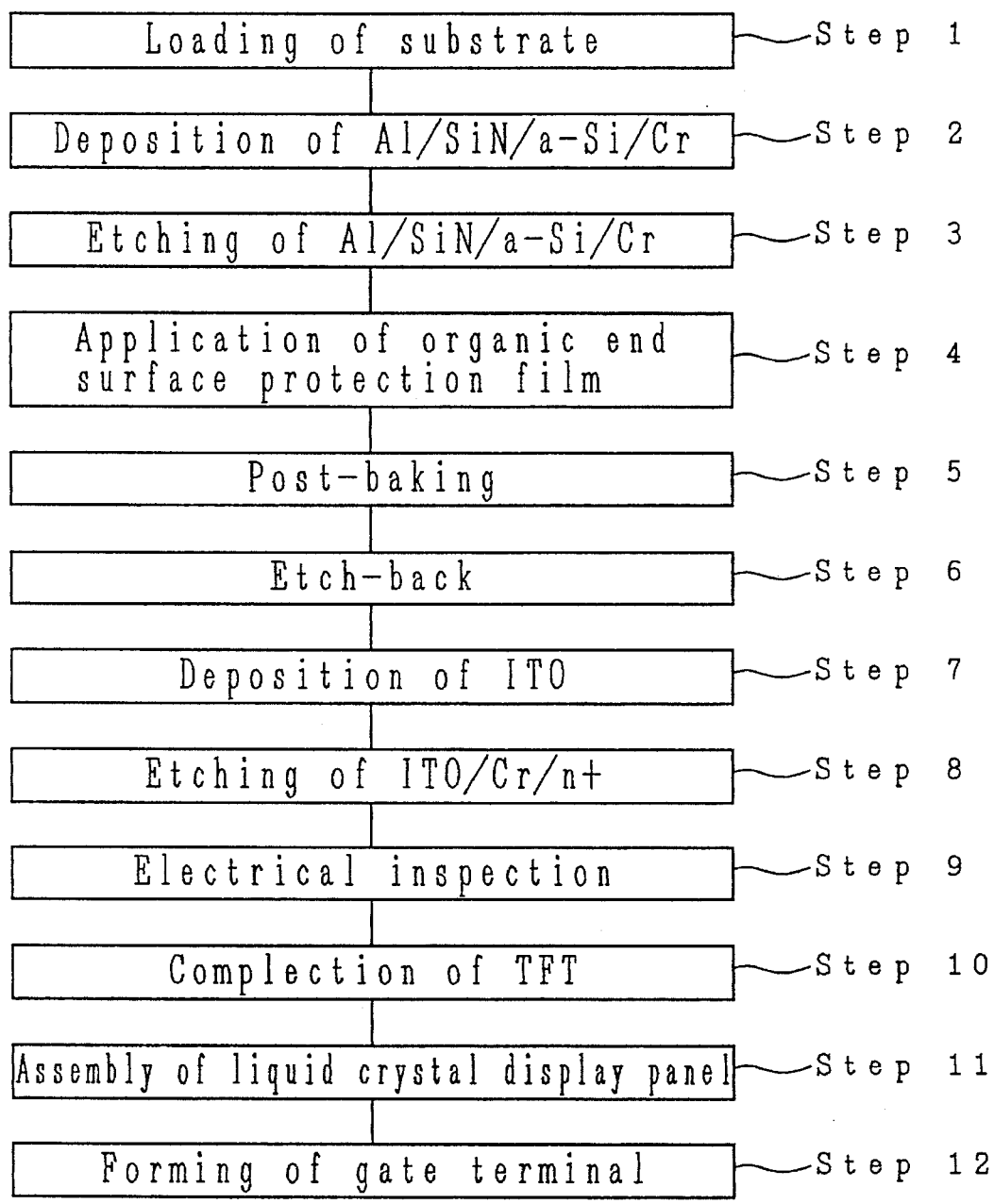
FIG. 16 is a process showing a further embodiment of the method of manufacturing the liquid crystal display substrate according to this invention.
Figure 17:
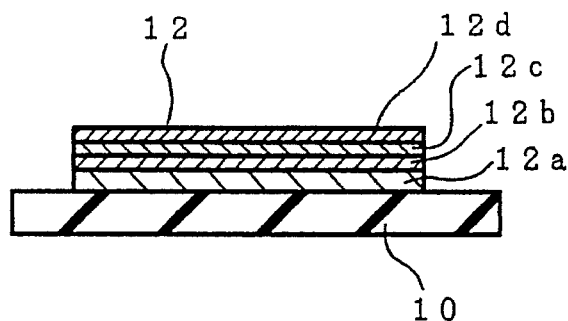
FIG. 17 is a cross section of the substrate at one point in the process of manufacturing the liquid crystal display substrate according to this invention.

In FIG. 16, the step 1 through 3 are the same as the corresponding step 1 through 3 of the Embodiment 1. The cross section of the gate busline 12 after the step 3 is shown in FIG. 17. Because this method does not involve the anodic conversion of the gate busline, it can also be applied to other gate metals such as chromium (Cr) and ITO in addition to aluminum (Al), tantalum (Ta) and titanium (Ti). The succeeding process will be described below.

Process 1 (Step 4)

Figure 18:
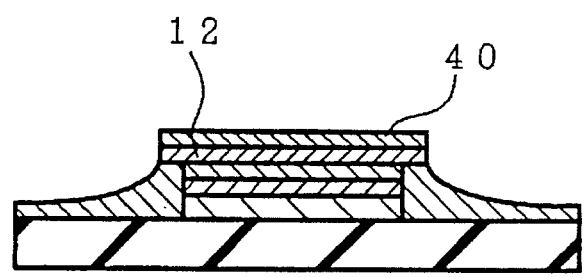
FIG. 18 is a cross section of the substrate at one point in the process of manufacturing the liquid crystal display substrate according to this invention.

An organic insulation agent is applied to the surface of the glass substrate 10. As shown in FIG. 18, the organic insulation agent covers not only the surface of the glass substrate 10 and the upper surface of the gate busline 12 but also the side wall surfaces of the gate busline 12 by the surface tension.

Process 2 (step 5)

The substrate is then subjected to post-baking to harden the organic insulation agent and thereby form an organic end surface protection film 40. The cross section of the gate busline 12 at this step is shown in FIG. 18.

Process 3 (step 6)

The substrate is then etched back to remove the organic insulation agent from the upper surfaces of the glass substrate 10 and the gate busline 12 and to expose the Cr layer 12e at the top of the gate busline 12. Although the etch-back also removes the organic insulation agent applied to the side wall surfaces of the gate busline 12, the organic insulation agent remains over the side wall surfaces because it is sufficiently thick.

Figure 19:
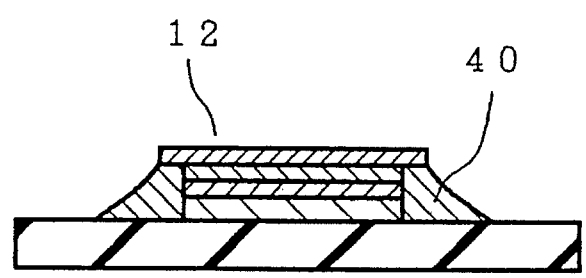
FIG. 19 is a cross section of the substrate at one point in the process of manufacturing the liquid crystal display substrate according to this invention.

The cross section of the gate busline 12 in this process is shown in FIG. 19.

The process after forming the ITO film to form the ITO drains 14 is similar to that of Embodiment 1.

Figure 20:
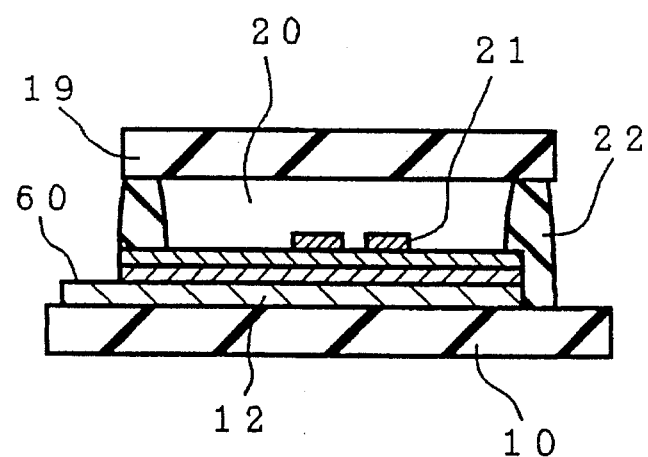
FIG. 20 is a cross section of the substrate at the completion of the process of manufacturing the liquid crystal display substrate according to this invention.

The cross section of the liquid crystal display substrate constructed in this way is shown in FIG. 20.

Embodiment 4

It is noted that the technique employed in the Embodiment 1 and the technique used in the Embodiment 3 may be combined to avoid electric short-circuits between the ITO drain 14 and the gate busline 12 more reliably.

Structure

Figure 21:
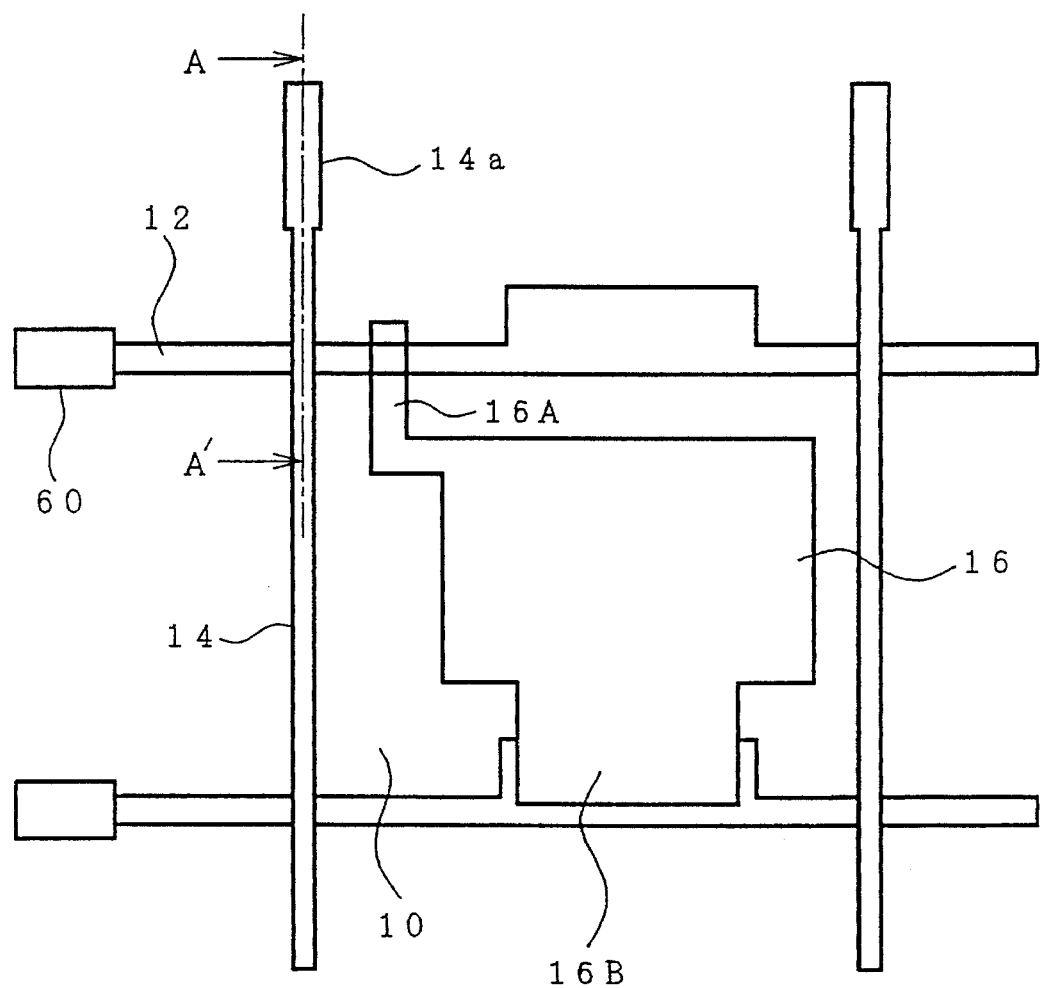
FIG. 21 is a plan view of a further embodiment of the liquid crystal display substrate according to this invention.
Figure 22:
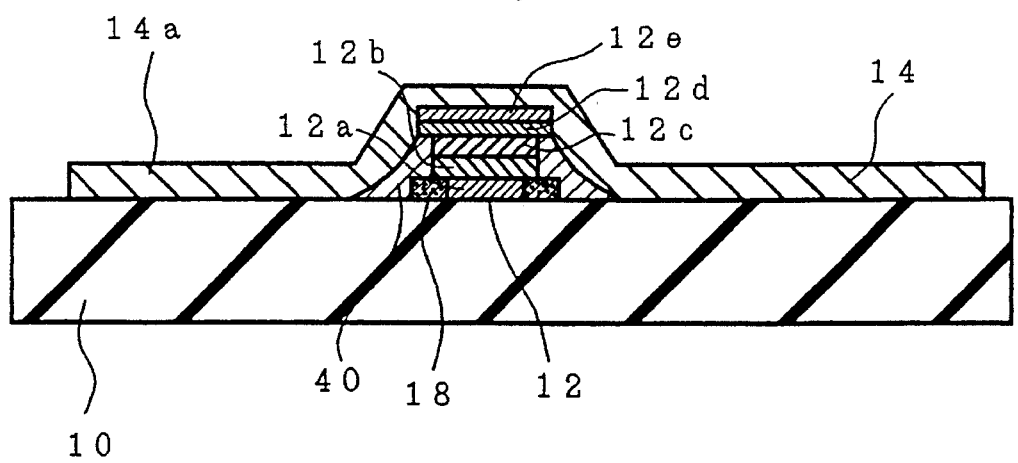
FIG. 22 is a cross section taken along the line A–A' of FIG. 21.

FIG. 21 is a plan view of the substrate and FIG. 22 a cross section taken along the line A-A' of FIG. 21. As shown in FIG. 22, an alumina conversion film 18 is formed at the side wall surfaces of an aluminum layer 12a at the bottom of the gate busline 12, and an organic end surface protection film 40 is formed over the side wall surfaces of the gate busline 12 to cover the alumina conversion film 18.

Method of Manufacture

Figure 23:
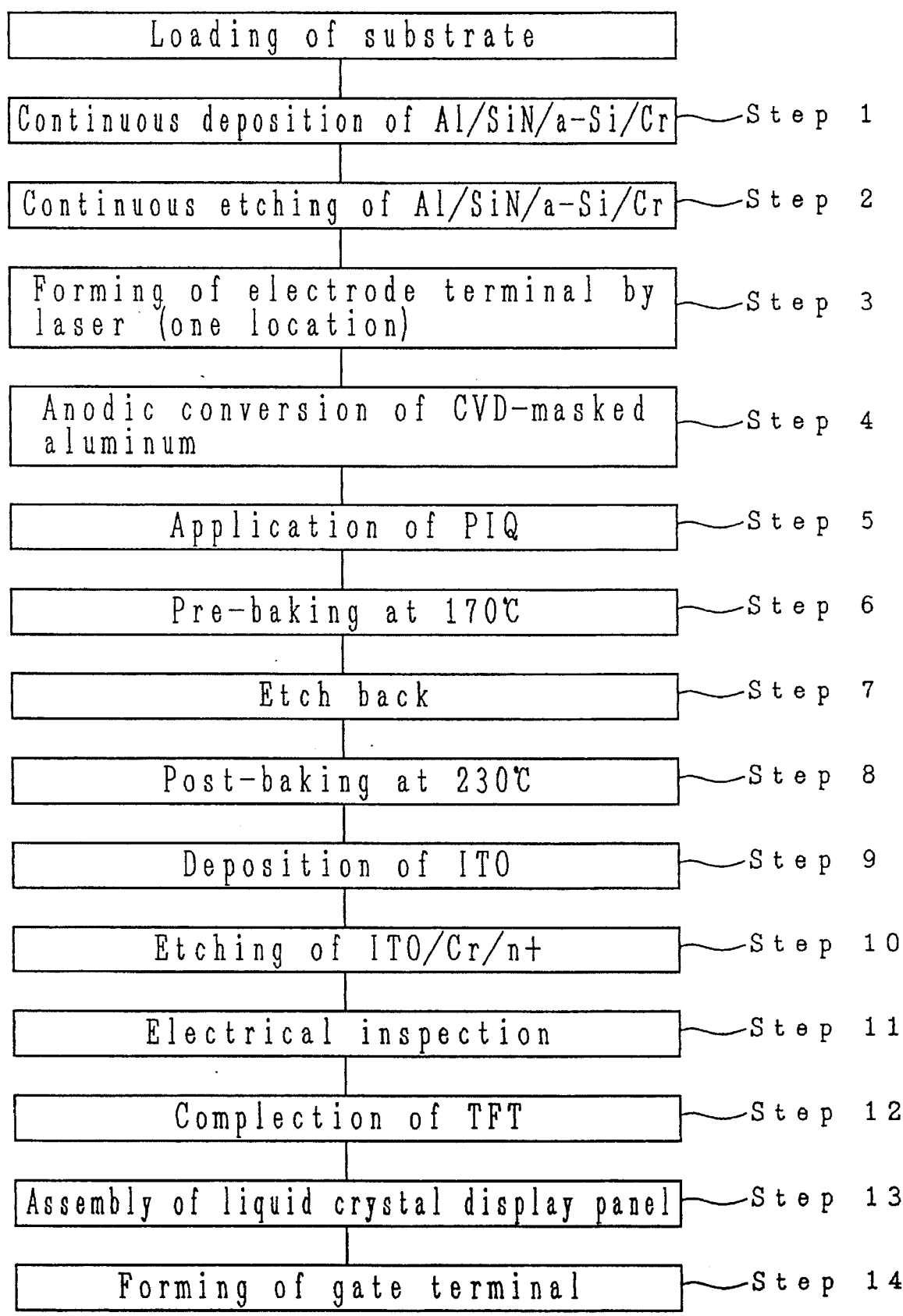
FIG. 23 is a process showing a further embodiment of the method of manufacturing the liquid crystal display substrate according to this invention.

One example method of manufacturing the above-mentioned structure is shown in FIG. 23.

Of the process shown in FIG. 23, the step 3 and step 4 form the alumina conversion film 18 in the same procedure used in the Embodiment 1. Performing the step 5 through step 8 forms the organic end surface protection film 40 in the same way as in the Embodiment 3.

Although the organic end surface protection film 40 may be formed in the same way as in the Embodiment 3, this fourth embodiment divides the baking of the organic insulation agent into a pre-baking after the application of the agent (step 6) and a post-baking after the etch-back (step 8).

Figure 24:
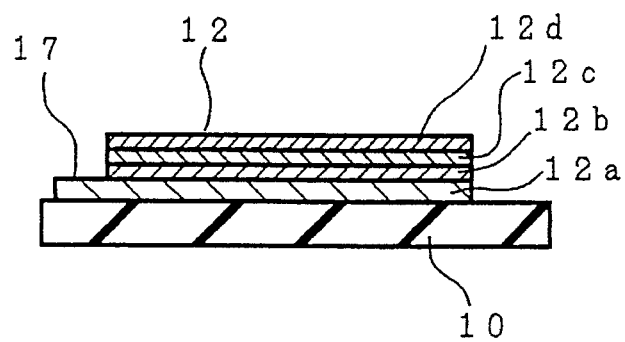
FIG. 24 is a cross section of the substrate at one point in the process of manufacturing the liquid crystal display substrate according to this invention.
Figure 25:
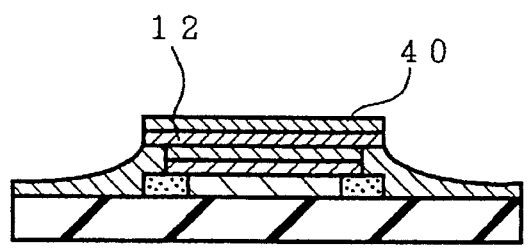
FIG. 25 is a cross section of the substrate at one point in the process of manufacturing the liquid crystal display substrate according to this invention.
Figure 26:
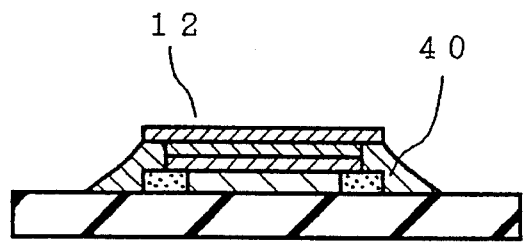
FIG. 26 is a cross section of the substrate at one point in the process of manufacturing the liquid crystal display substrate according to this invention.
Figure 27:
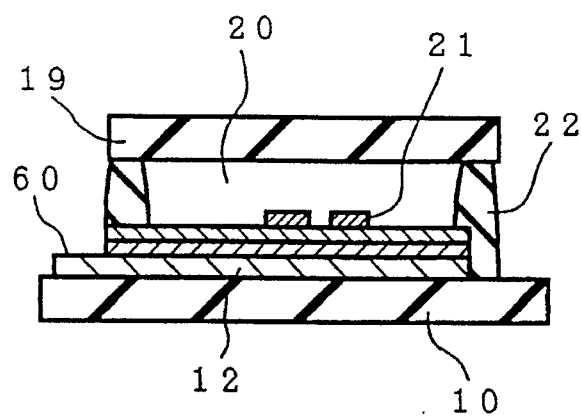
FIG. 27 is a cross section of the substrate at the completion of the process of manufacturing the liquid crystal display substrate according to this invention.

FIG. 24 corresponds to step 3, FIG. 25 step 6, FIG. 26 step 7, and FIG. 27 step 14.

Embodiment 5

Figure 28:
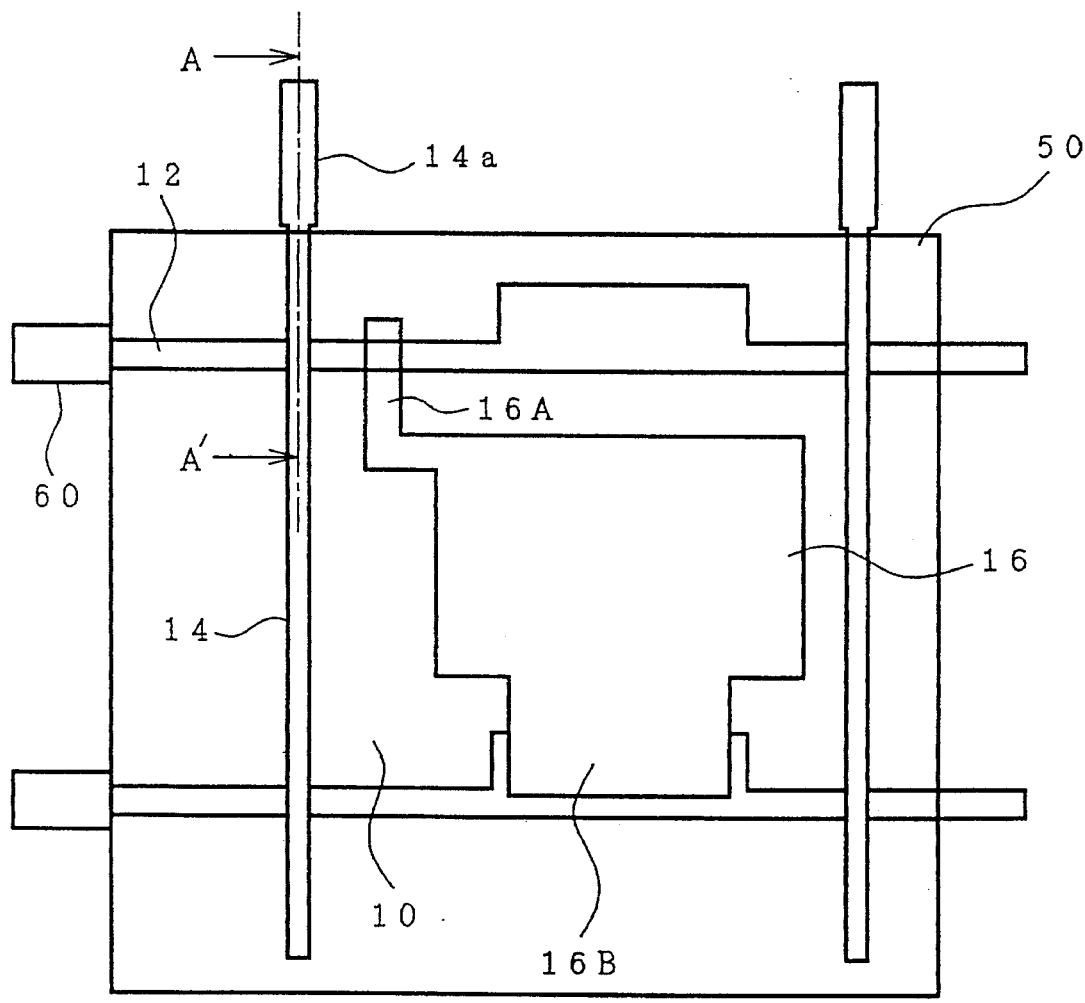
FIG. 28 is a plan view of a further embodiment of the liquid crystal display substrate according to this invention.
Figure 29:
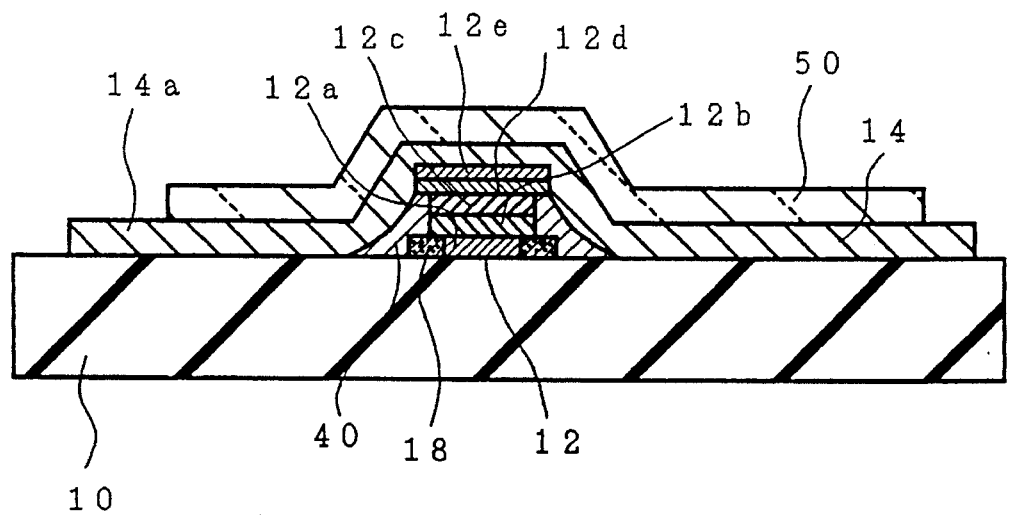
FIG. 29 is a cross section taken along the line A–A' of FIG. 28.

Although none of the preceding embodiments has a protection film called a passivation film, such a protection film may be used as shown in FIG. 28 and FIG. 29.

Structure

FIG. 28 is a plan view of the substrate and FIG. 29 a cross section taken along the ling A-A' of FIG. 28.

As shown in FIG. 28, the protection film of an organic PAS 50 is formed over the surface of the glass substrate 10 on which were formed the gate buslines 12, ITO drains 14 and ITO pixels 16.

Method of Manufacture

As shown in FIG. 30, the substrate is formed by almost the same process as used in the Embodiment 5. After the deposition of ITO drains 14, the organic insulation agent is applied (step 12) and subjected to the post-baking to be hardened (step 13) to form the organic PAS 50.

Figure 31:
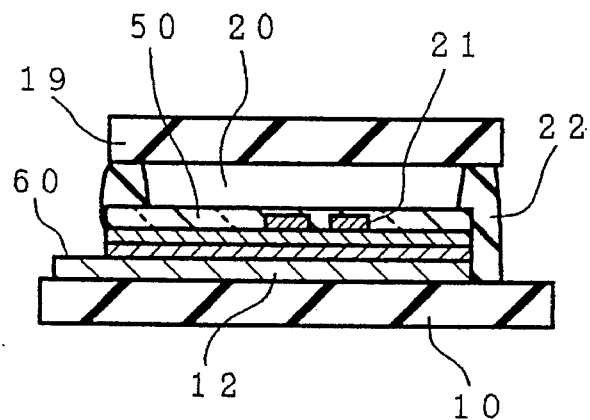
FIG. 31 is a cross section of the substrate at the completion of the process of manufacturing the liquid crystal display substrate according to this invention.

The cross section of the liquid crystal display substrate made in this way is shown in FIG. 31.

The organic PAS 50 may be replaced by an inorganic film such as silicon nitride film.

Embodiment 6

The gate terminal of the gate busline 12 in the Embodiment 5 described above is formed by exposing the bottom aluminum layer 12a from the organic PAS 50. The gate terminal may be formed otherwise. For example, as shown in FIG. 32 and FIG. 33, the ITO film connected to the aluminum layer 12a may be used as the gate terminal 60.

Structure

Figure 32:
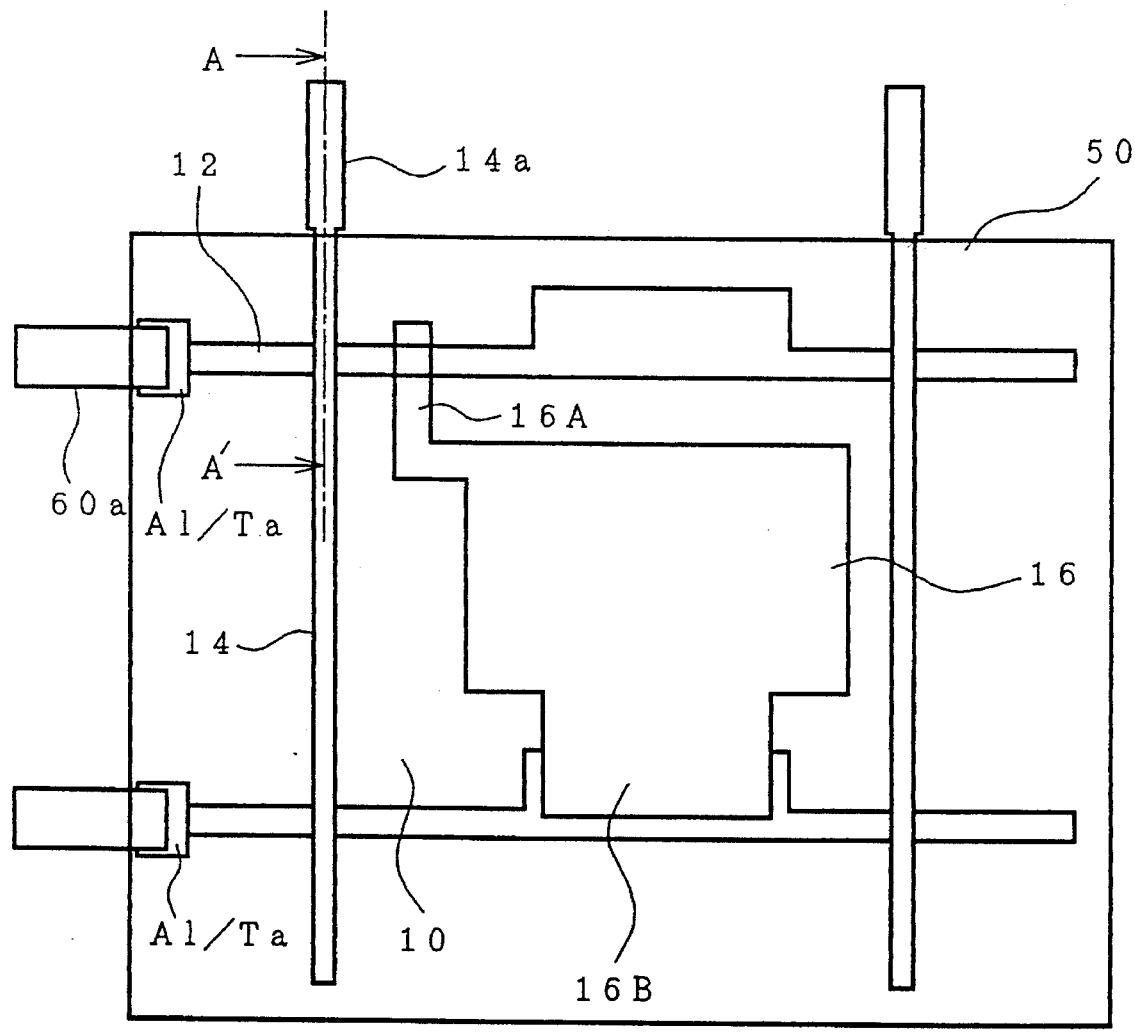
FIG. 32 is a plan view of a further embodiment of the liquid crystal display substrate according to this invention.
Figure 33:
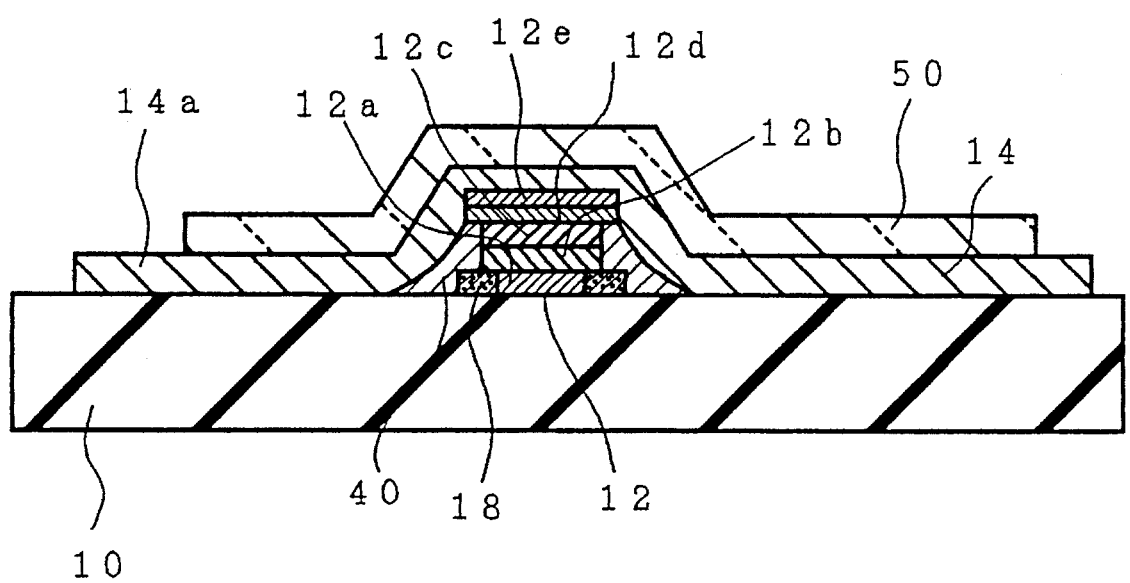
FIG. 33 is a cross section taken along the line A–A' of FIG. 32.

FIG. 32 is a plan view of the substrate and FIG. 33 a cross section taken along the line A-A' of FIG. 32.

The gate busline 12 is formed as a multi-layered structure consisting of, from the glass substrate 10 toward the top, an aluminum (Al) layer, a tantalum (Ta) layer, a silicon nitride (SiN) layer, an amorphous silicon (a-Si) layer, an n(+) layer and a chromium (Cr) layer, as shown in FIG. 33. It should be noted that the Ta layer is formed over the surface of the Al layer.

As shown in FIG. 32, at the gate terminal lead-out portion of the gate busline 12, the Ta layer overlying the Al layer is exposed and is connected to the ITO that forms the gate terminal 60.

The Ta layer is an interposing layer to provide reliable connection between the Al layer and the ITO.

The organic PAS 50 is formed covering the connections between the gate terminals 60 of ITO and the gate buslines 12.

Method of Manufacture

Figure 34:
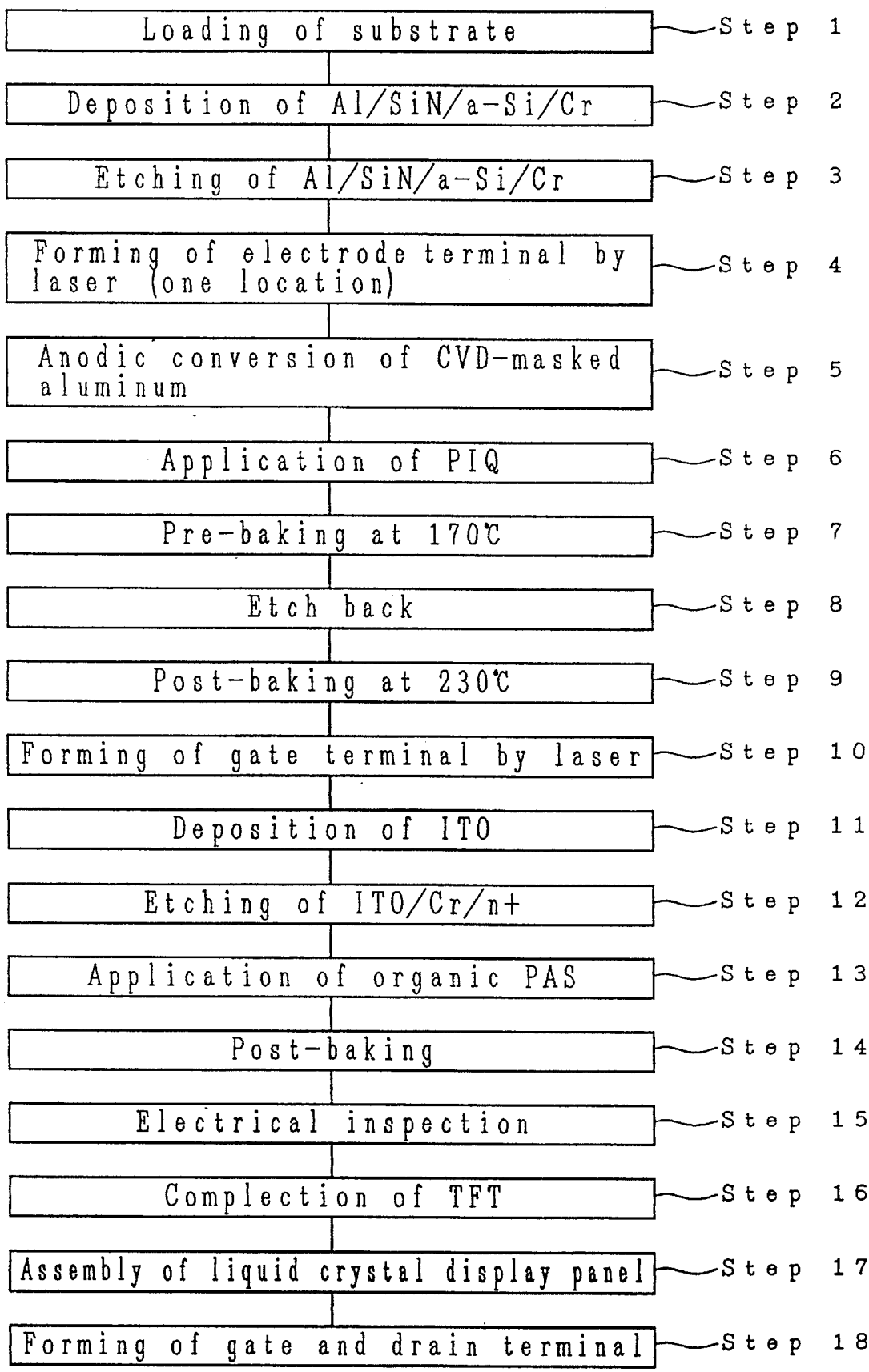
FIG. 34 is a process showing a further embodiment of the method of manufacturing the liquid crystal display substrate according to this invention.

What basically differs from the manufacturing method of the Embodiment 5 is described below. As shown in FIG. 34, the surface of the glass substrate 10 is formed successively with Al layer, Ta layer, SiN layer, a-Si layer and Cr layer (step 2). This multi-layered structure is selectively etched away to form gate buslines 12 (step 3).

Then, the Al layer and Ta layer, both exposed at the side wall surfaces of the gate buslines 12, are oxidized by the anodic conversion (step 5). In the gate forming process using a laser beam (step 10), the Cr layer, a-Si layer and SiN layer of the gate buslines 12 are successively etched to expose the Ta layer.

The ITO film, after being formed, is selectively etched away to form the ITO pixels 16 and the gate terminals 60 at the same time (step 12).

Then, in the gate/drain terminal forming process after the liquid crystal assembly, the gate and drain terminals are led out by using the lower substrate mask (step 18) because the organic PAS is applied over the entire area of the substrate.

Figure 35:
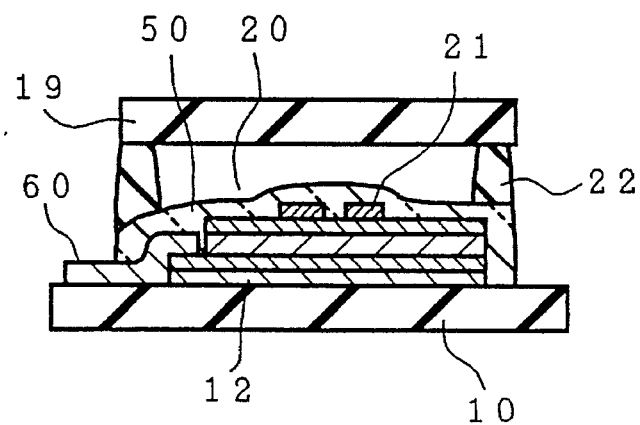
FIG. 35 is a cross section of the substrate at the completion of the process of manufacturing the liquid crystal display substrate according to this invention.

The cross section of the liquid crystal display substrate formed in this way is shown in FIG. 35.

Embodiment 7

Figure 36:
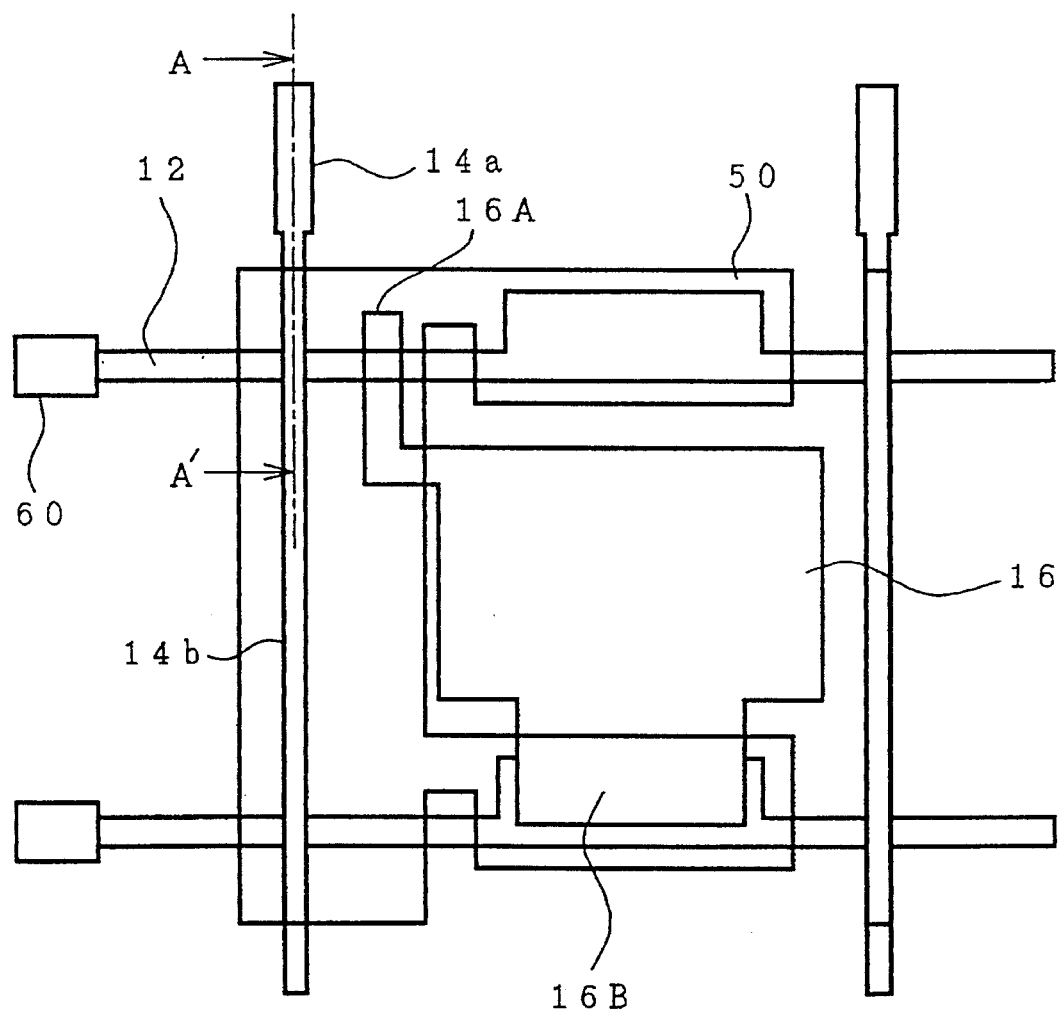
FIG. 36 is a plan view of a further embodiment of the liquid crystal display substrate according to this invention.
Figure 37:
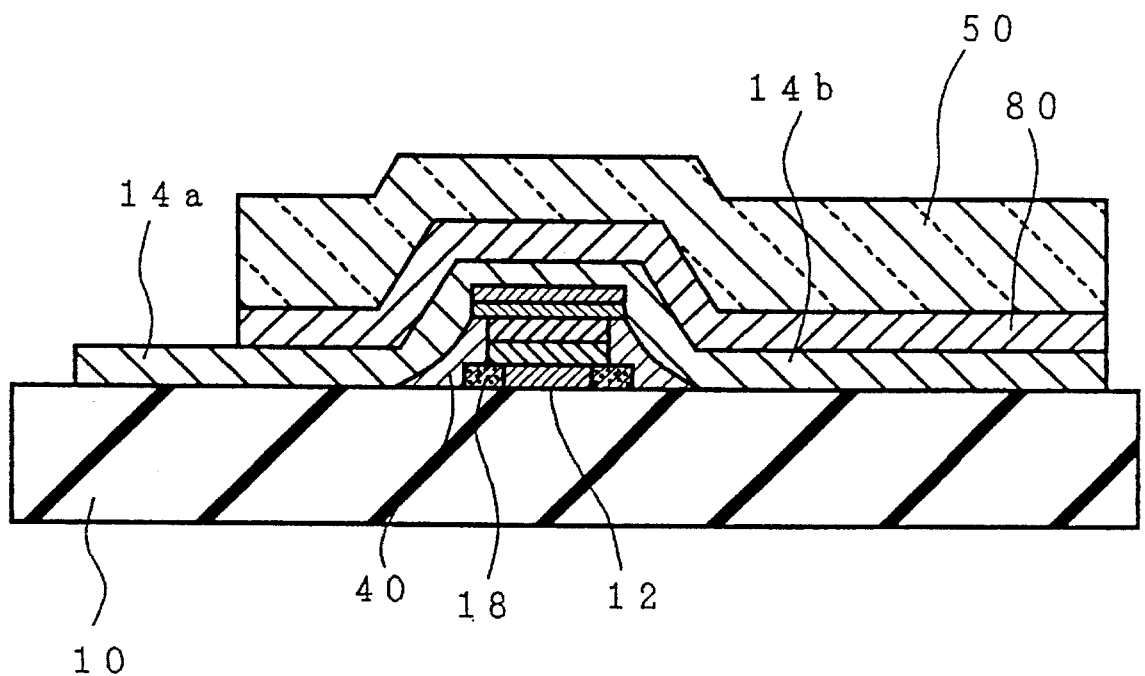
FIG. 37 is a cross section taken along the line A–A' of FIG. 36.
Figure 38:
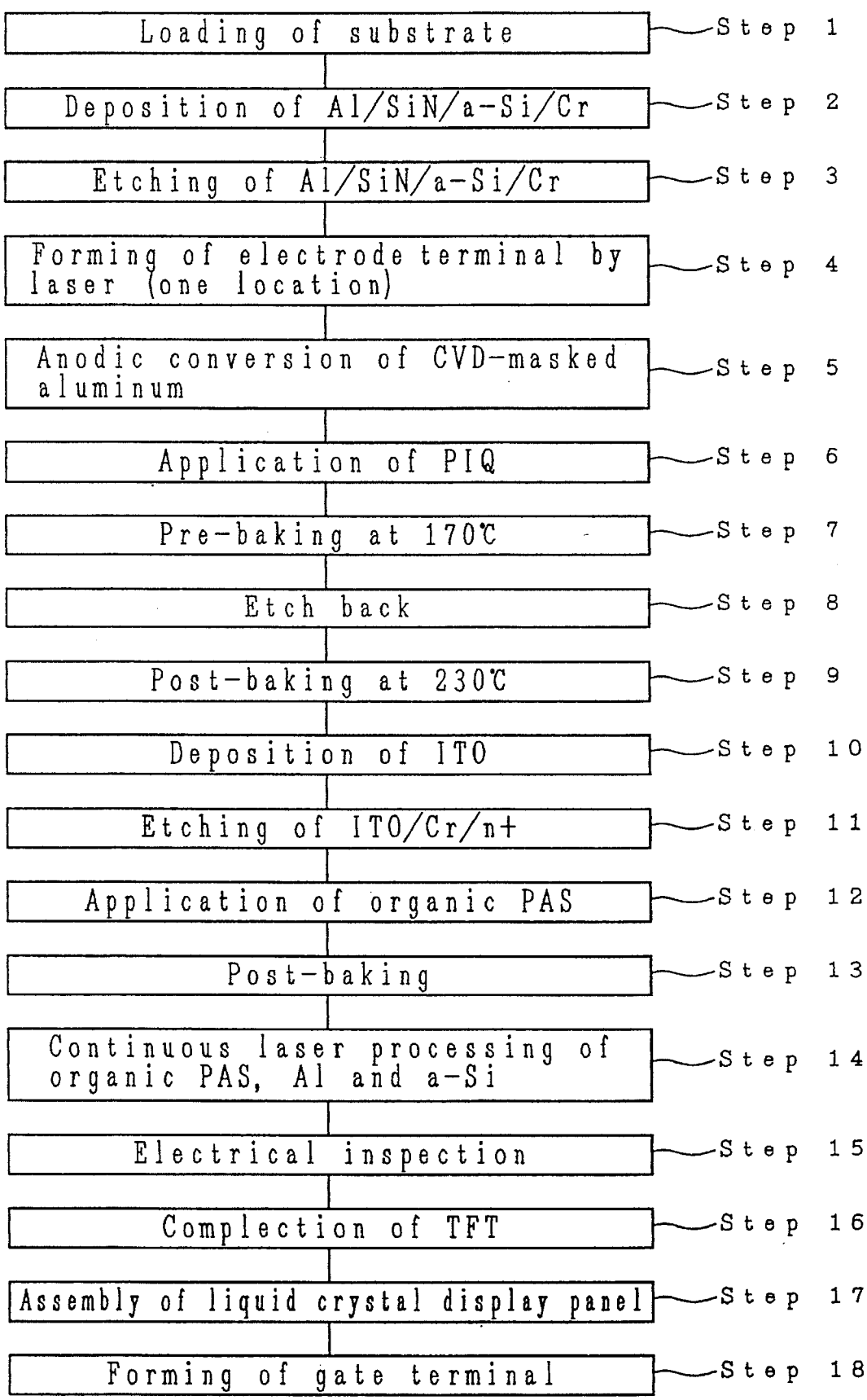
FIG. 38 is a process showing a further embodiment of the method of manufacturing the liquid crystal display substrate according to this invention.
Figure 39:
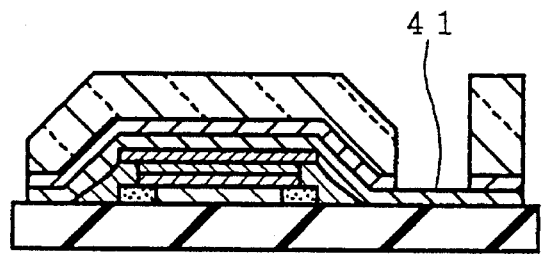
FIG. 39 is a cross section of the substrate at one point in the process of manufacturing the liquid crystal display substrate according to this invention.

Although the organic PAS 50 in the Embodiment 5 and Embodiment 6 is formed over the entire area of the glass substrate 10 including ITO pixels, it may be formed in a minimum required area as shown in FIG. 36 and FIG. 37.

Structure

FIG. 36 is a plan view of the substrate and FIG. 37 a cross section taken along the line A–A' of FIG. 36.

In FIG. 36, the organic PAS 50 is formed for each pixel in areas other than at least ITO pixel 16 forming regions and covers the gate buslines 12 and the ITO drains 14.

In this seventh embodiment, beneath the organic PAS 50 thus formed, there is an aluminum layer 80 formed over the surface of the ITO drain 14.

In the region of the organic PAS 50, a part of the gate busline 12 is exposed. The a-Si layer, a top layer of the exposed gate busline 12, is etched with the organic PAS 50 serving as a mask to expose the underlying SiN layer.

The liquid crystal display substrate of the above construction has the aluminum layer formed on a part of the ITO drains 14 and ITO pixels underlying the organic PAS 50. This reduces the resistance of the ITO drains 14 and the ITO pixels, offering the advantage of eliminating brightness variations which would result from relatively large resistance of the ITO.

Method of Manufacture

The manufacture of the liquid crystal display substrate of such a construction differs from that of the Embodiment 6 in the following points.

After the ITO film is formed over the entire surface of the glass substrate 10, an aluminum film is formed on the entire area of this ITO film (step 10). The ITO film along with the aluminum film is selectively etched away according to the pattern of the ITO drain 14 (step 11). In this process, the Cr layer and n(+) layer, top layers of the gate buslines 12 other than the gate buslines 12 beneath the ITO drains 14, are also etched away, as in the sixth embodiment.

The glass substrate 10 thus processed is then applied with an organic insulation agent over the entire surface and then post-baked (step 12, 13). The organic insulation agent is selectively etched away according to the pattern of FIG. 36 by a laser beam to form the organic PAS 50. The laser beam etching of the organic insulation agent may of course be replaced with an ordinary photoprocessing. With the organic PAS 50 as a mask, the aluminum layer 80 on the surface of the ITO drains 14 and the a-Si layer on the surface of the gate buslines 12, both exposed from the organic PAS 50, are etched (step 14). The etching of the a-Si layer removes the part of the a-Si layer extending over the gate buslines and therefore eliminates floating transistor elements, improving the quality of display.

Embodiment 8

Figure 40:
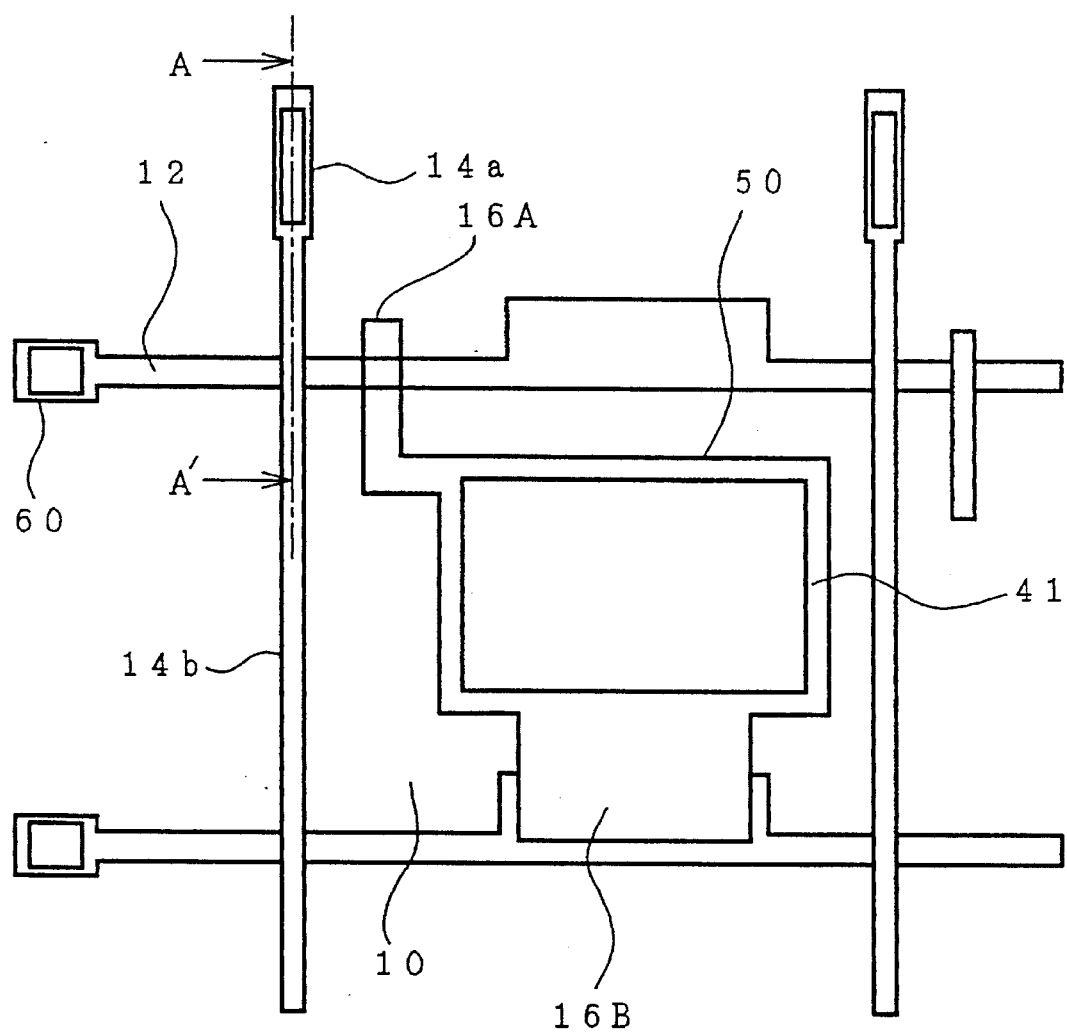
FIG. 40 is a plan view of a further embodiment of the liquid crystal display substrate according to this invention.

In this embodiment, the organic PAS 50 is formed only on the surface of the ITO drains 14 and on the surface of the peripheral area of the ITO pixels 16 excluding the center, as shown in FIG. 40.

Figure 41:
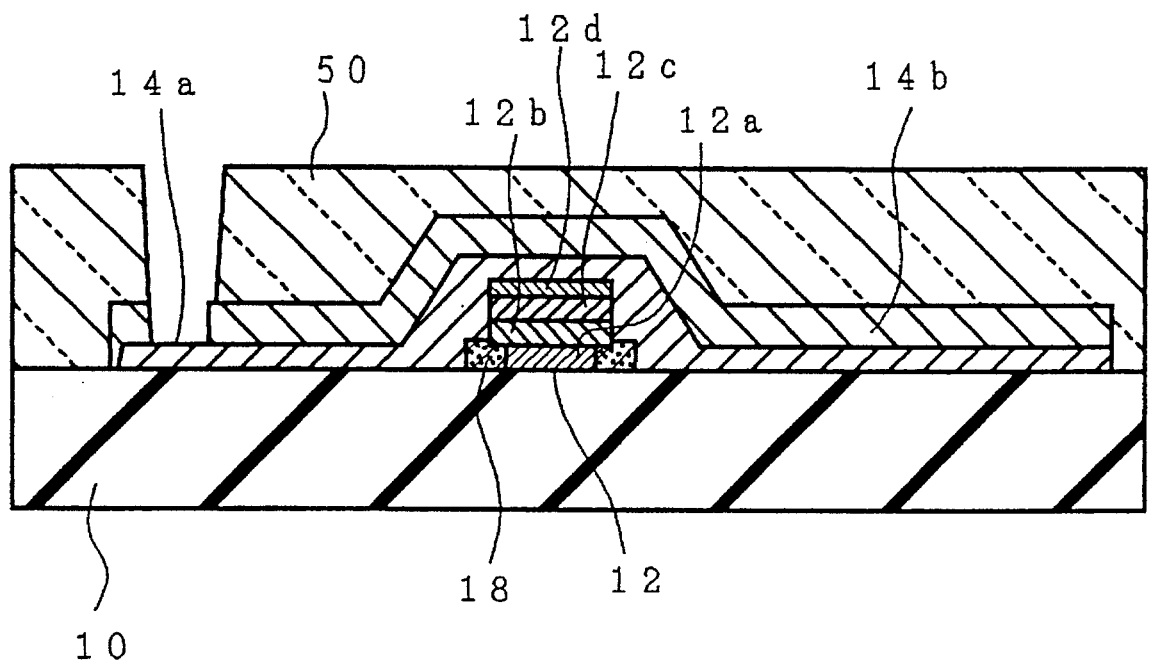
FIG. 41 is a cross section taken along the line A–A' of FIG. 40.

As can be seen from FIG. 41, which is a cross section taken along the line A–A' of FIG. 40, the ITO terminal of the ITO drain 14 has its ITO film exposed by the laser beam etching of the organic PAS 50 and aluminum layer.

Embodiment 9

Figure 42:
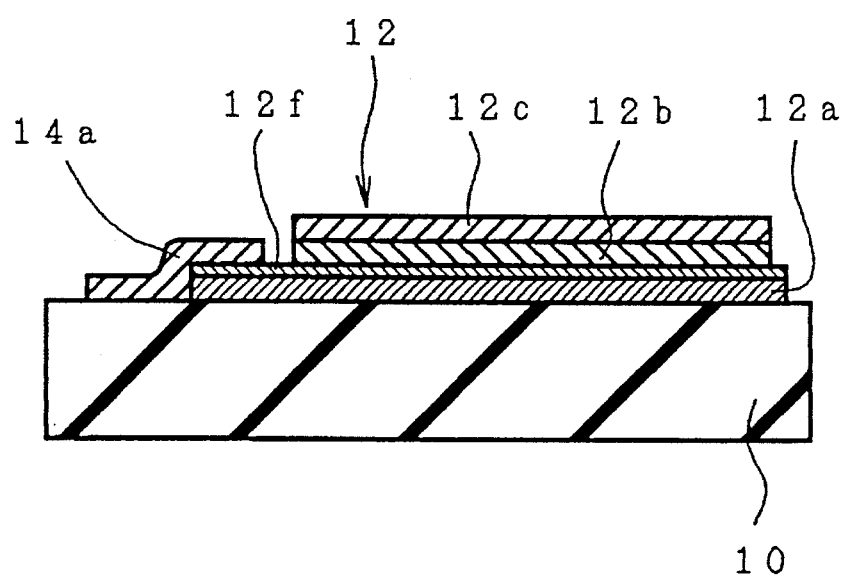
FIG. 42 is a cross section of a further embodiment of the liquid crystal display substrate according to this invention.

FIG. 42 is a cross section taken along the gate busline 12. When the gate terminal is made of an ITO layer, a boundary metal layer 12f is provided over the surface of the aluminum layer 12a of the gate busline 12 to stabilize the connection between the aluminum layer 12 and the gate terminal. The boundary metal layer 12f may use such metals as Ta, W, Cr, and Mo. When materials such as W, Cr and Mo are used, however, it should be noted that these metals cannot be subjected to the anodic conversion, so that isolation of the side walls of the gate buslines may be effected by covering them with organic insulation materials.

Classed as the so-called anti-stagger structure having the gate insulation film and a-Si layer stacked on the gate, the TFT structures of the preceding embodiments specifically concern a channel etch type in which an n-type amorphous silicon film doped with a high concentration of phosphine is formed integrally continuous with the a-Si layer.

This invention, however, is not limited to the channel etch type as long as the TFT structure is of the anti-stagger structure. For example, it may be a so-called channel protection type.

Embodiment 10

This embodiment is a channel protection version of the TFT of the Embodiment 1, which is of the channel etch type.

Structure

Figure 43:
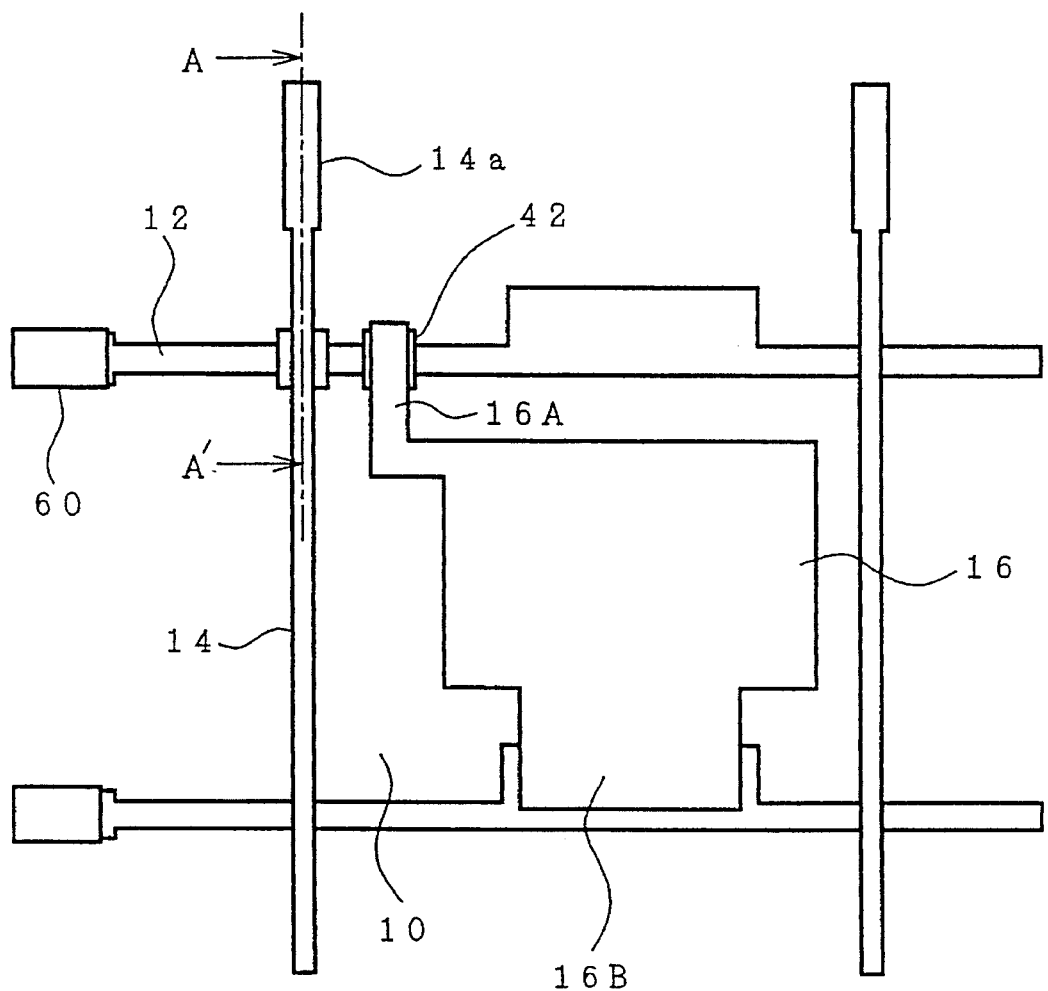
FIG. 43 is a plan view of a further embodiment of the liquid crystal display substrate according to this invention.
Figure 44:
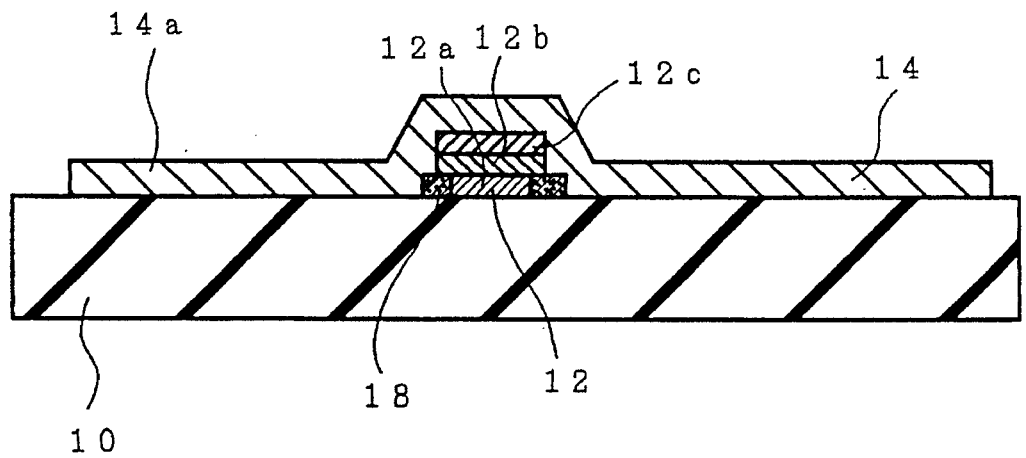
FIG. 44 is a cross section taken along the line A–A' of FIG. 43.

FIG. 43 is a plan view of the substrate and FIG. 44 a cross section taken along the line A–A' of FIG. 43. As shown in FIG. 43 and 44, the gate buslines 12—each of which consists of Al layer 12a, SiN film 12b, a-Si layer 12c and SiN film 12f stacked in layers—have the side wall surfaces of the gate metal electrically insulated by the anodic conversion.

The SiN film 12f is a channel protection film and is formed with a contact hole only where the gate buslines intersect the drains and sources, to provide contact between the a-Si layer beneath the channel protection layer and the drain or source.

FIG. 44 does not show the channel protection film because the illustrated cross section is where there is a contact hole.

Method of Manufacture

Figure 45:
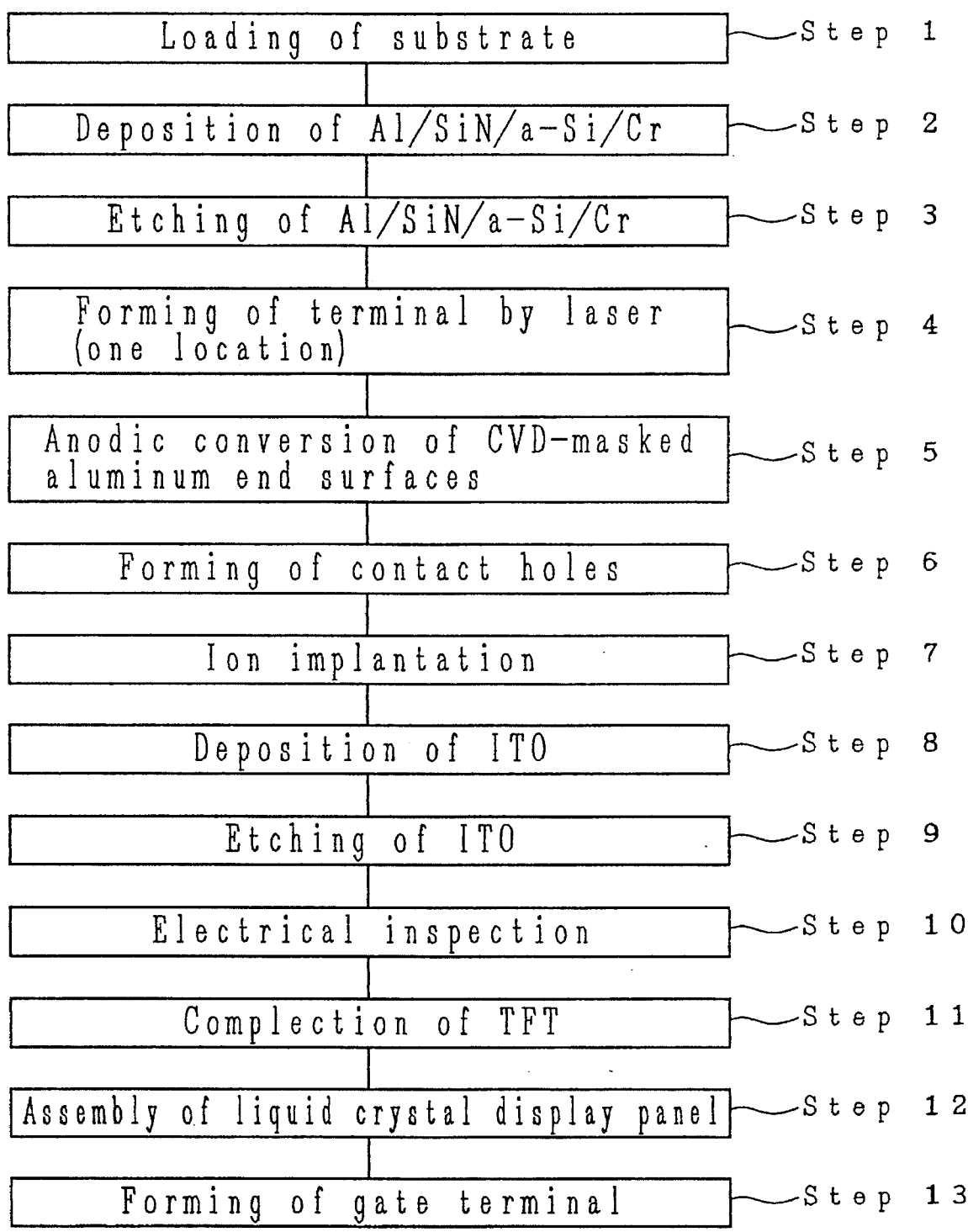
FIG. 45 is a process showing one embodiment of the method of manufacturing the liquid crystal display substrate shown in FIG. 43.

One example method of making the liquid crystal display substrate of the above construction is described by referring to FIG. 45.

In FIG. 45, the step 2 forms successively a gate metal, a gate insulation film, an a-Si film and, as a channel protection film, a SiN film. This process does not include the selective etching of the highly doped n-type a-Si film and the a-Si film and therefore allows the a-Si film to be reduced in thickness to 50 nm.

Figure 46:
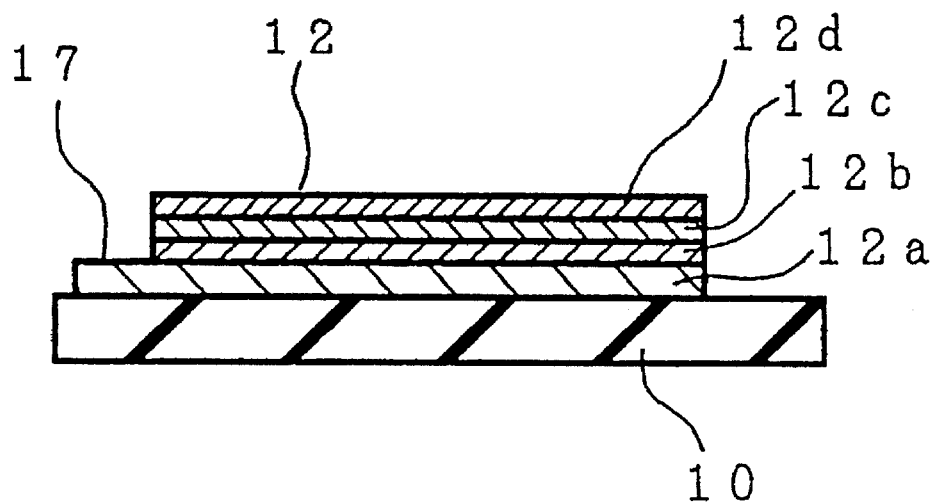
FIG. 46 is a cross section showing the structure of the liquid crystal display substrate at one point in the process of FIG. 45.

Insulation of the end surfaces of the gate metal as performed by step 3 to step 5 is the same as in the Embodiment 1. The resulting structure is shown in FIG. 46.

Next at step 6, contact holes are formed in a part of the channel protection film by the ordinary photolithography. This is followed by implanting the exposed a-Si film with phosphine ($PH_3$) ions to turn the a-Si at the contact holes into the n-type a-Si. It is noted that this process may also be achieved by forming a highly doped n-type a-Si film and processing it.

Figure 47:
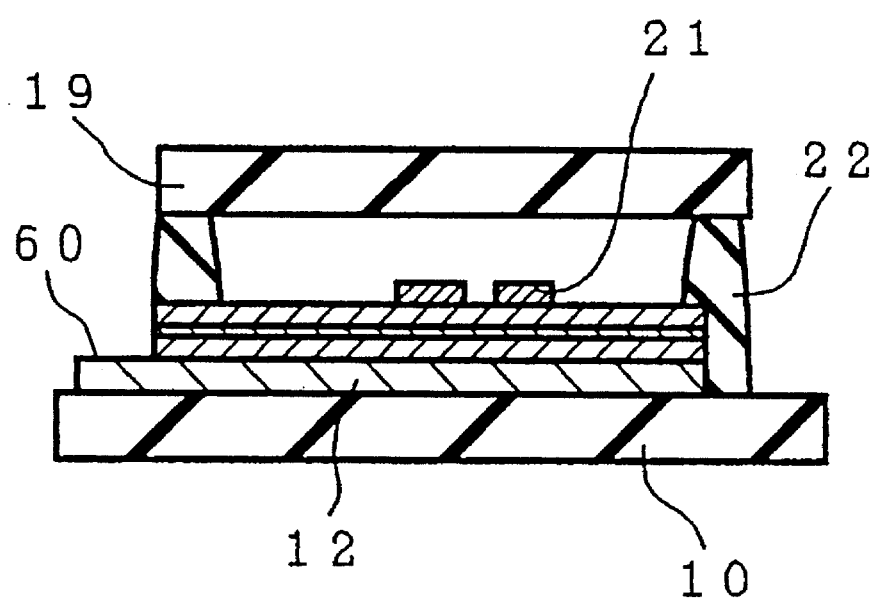
FIG. 47 is a cross section showing the structure of the liquid crystal display substrate at one point in the process of FIG. 45.

The cross section of the liquid crystal display substrate thus formed is shown in FIG. 47.

Embodiment 11

While the preceding embodiments use an amorphous silicon (a-Si) for the silicon film, it is obvious that a polysilicon (p-Si) may be used instead. Here, an example is shown which employs p-Si instead of a-Si, which was used in the Embodiment 10.

Structure

Figure 48:
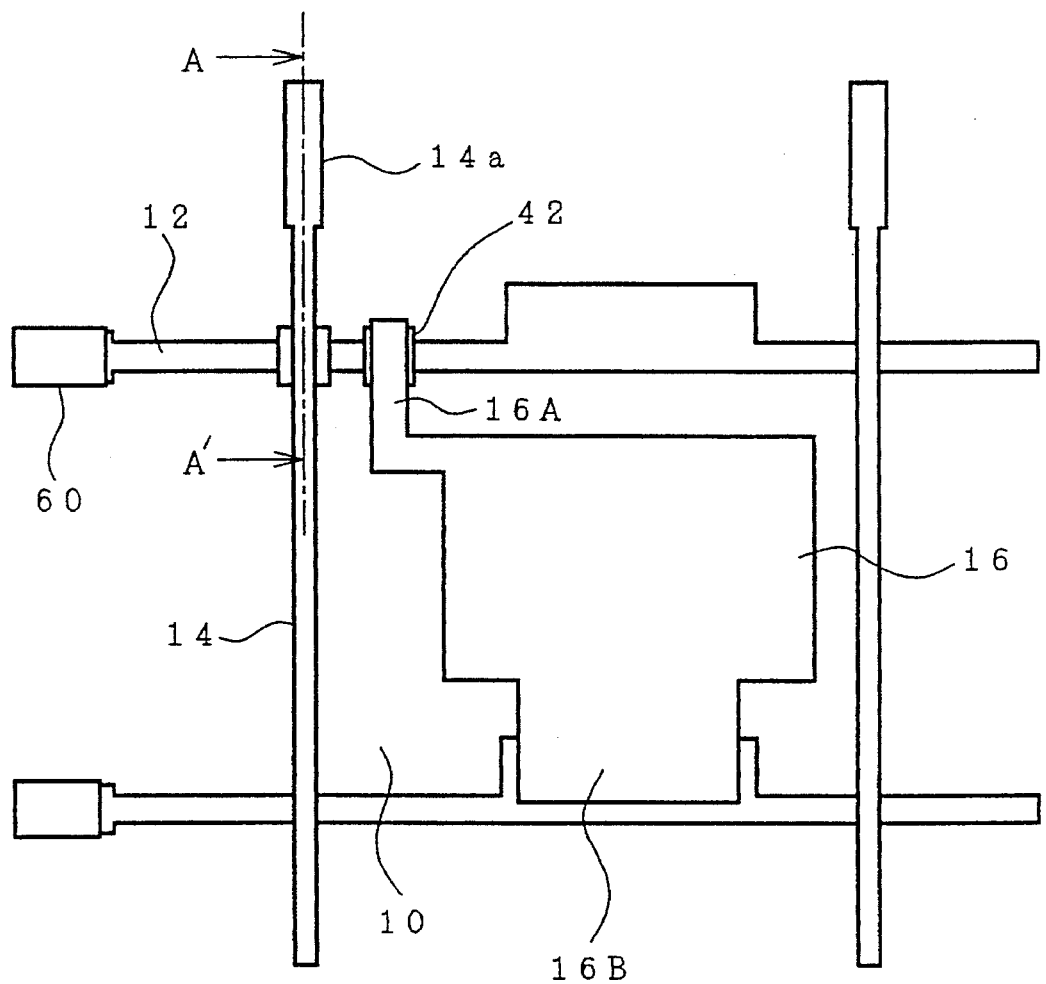
FIG. 48 is a plan view of a further embodiment of the liquid crystal display substrate according to this invention.
Figure 49:
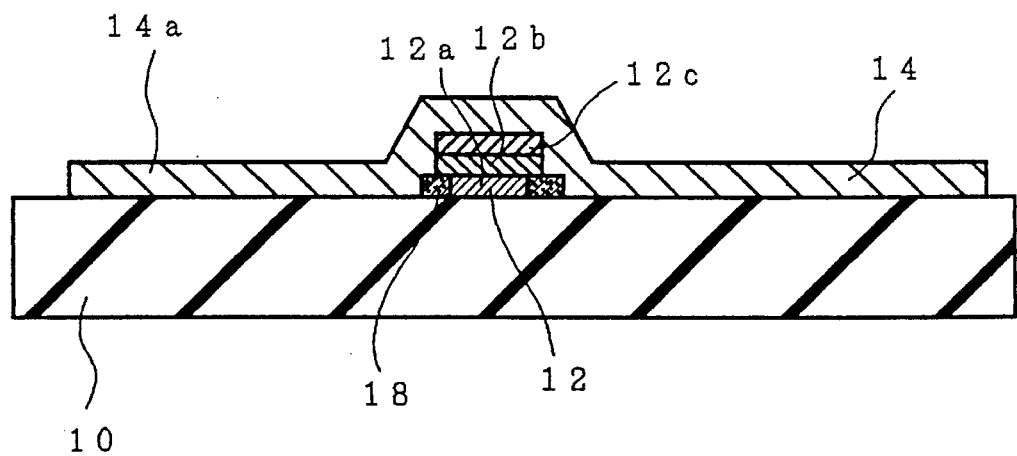
FIG. 49 is a cross section taken along the line A–A' of FIG. 48.

FIG. 48 is a plan view of the substrate and FIG. 49 a cross section taken along the line A–A' of FIG. 48. As shown in FIGS. 48 and 49, the structure is almost the same as that of the Embodiment 10, except that the silicon film uses polysilicon rather than amorphous silicon.

Method of Manufacture

Figure 50:
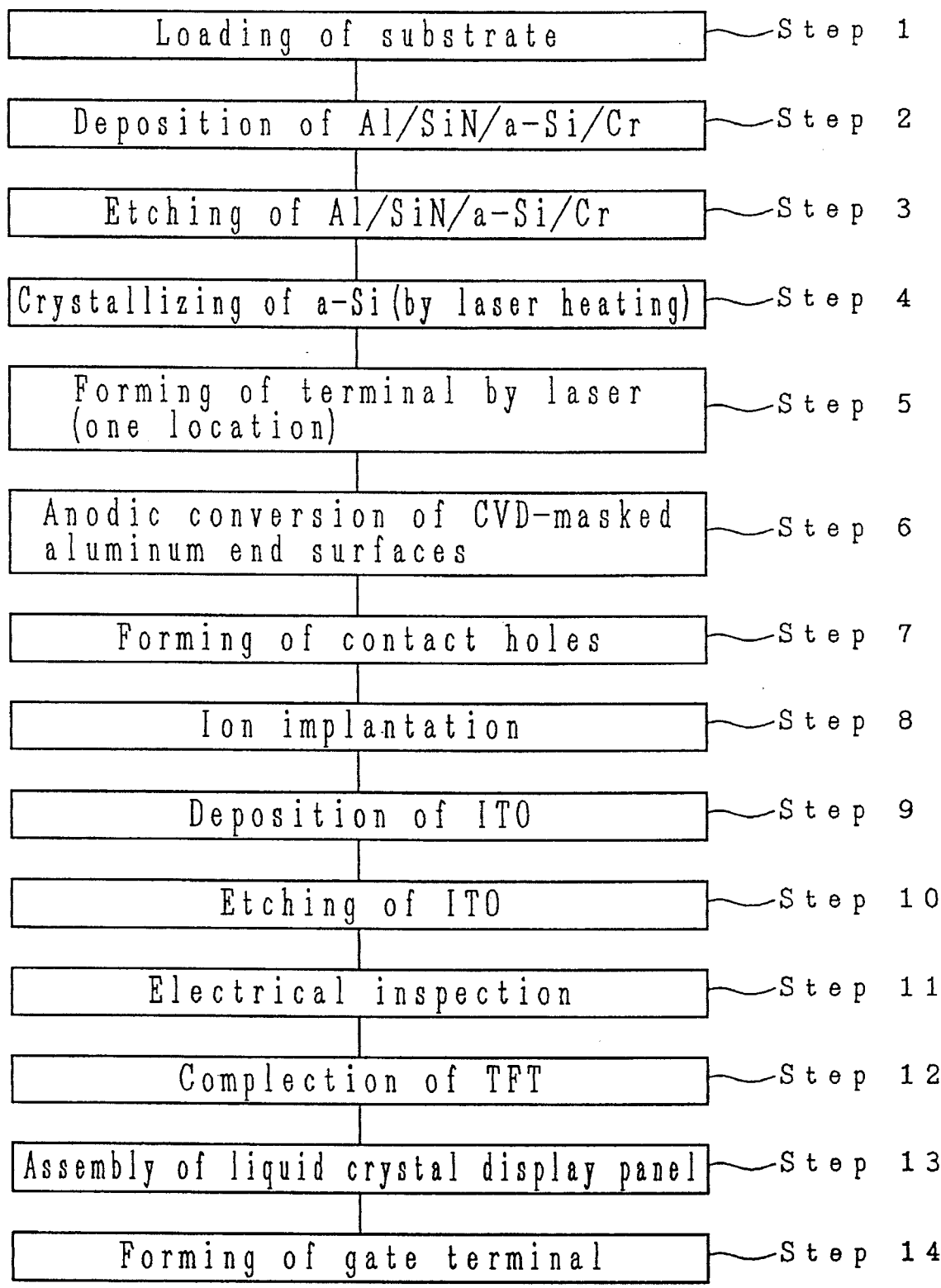
FIG. 50 is a process showing one embodiment of the method of manufacturing the liquid crystal display substrate shown in FIG. 48.
Figure 51:
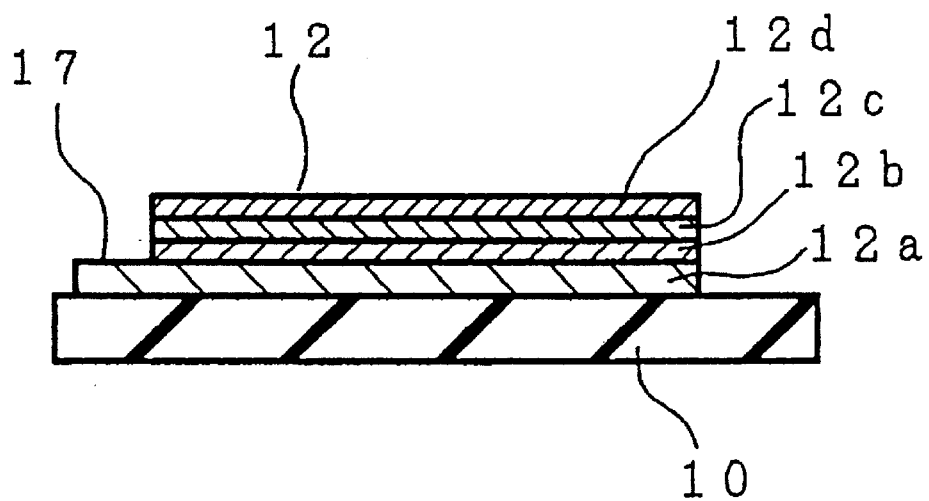
FIG. 51 is a cross section showing the structure of the liquid crystal display substrate at one point in the process of FIG. 50.

As shown in FIG. 50, the manufacturing process is almost similar to that of the Embodiment 10. In step 4, however, the a-Si film on the gate busline is radiated with an ultraviolet laser beam to be crystallized. Thus, when the terminal forming process before anodic conversion is completed at step 5, the cross section of the gate busline consists of, from the substrate side toward the top, 120 nm of Al, 400 nm of SiN, 50 nm of p-Si and 200 nm of SiN, as shown in FIG. 51.

Figure 52:
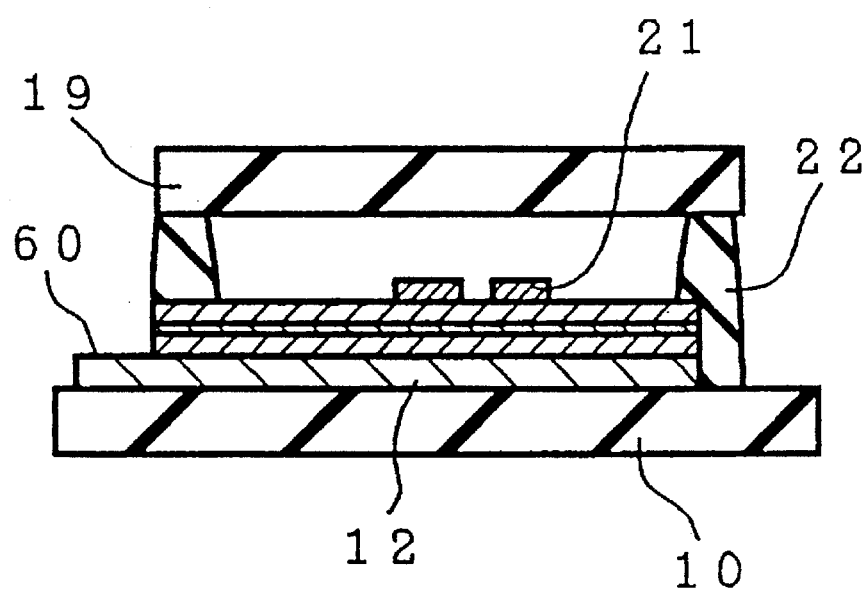
FIG. 52 is a cross section showing the structure of the liquid crystal display substrate at one point in the process of FIG. 50.

The cross section of the liquid crystal display substrate thus formed is shown in FIG. 52. While a channel protection type TFT is used in this embodiment, the same manufacturing process can also be applied to the channel etch type TFT.

What is claimed is:

1. A liquid crystal display substrate comprising:

pixel electrodes;

thin-film transistors, each having a gate electrode, a drain and a source, the gate electrode being applied with a voltage to impress a voltage on the associated pixel electrode through the drain and source of the thin-film transistor, each thin-film transistor having a gate insulating film overlying the gate electrode, a silicon layer on the gate insulating film, and a highly doped silicon film on the silicon layer, sides of the gate electrode not being covered by the gate insulating film such that the sides are exposed thereby, and an insulating layer, different from the gate insulating film, covering the sides of the gate electrode and not covering a top of the gate electrode; and interconnect layers or buslines connected to gate electrodes of the thin-film transistors.

2. A liquid crystal display substrate according to claim 1, wherein the insulating layer is a layer formed by an anodic conversion of material of the gate electrode.

3. A liquid crystal display substrate according to claim 1, wherein the gate electrode is made of at least one layer made of a material selected from the group consisting of aluminum, tantalum and titanium and their alloys.

4. A liquid crystal display substrate according to claim 1, wherein the insulating layer is made of an organic insulating material.

5. A liquid crystal display substrate according to claim 1, wherein said gate electrode and said gate insulating film have a same shape and dimensions.

6. A liquid crystal display substrate according to claim 5, wherein said silicon layer and said highly doped silicon film also have said same shape and dimensions.

7. A liquid crystal display substrate according to claim 1, wherein the interconnect layers or buslines are extensions of said gate electrodes.

8. A liquid crystal display substrate according to claim 1, wherein the gate electrode, gate insulating film, silicon layer and highly doped silicon film all have a pattern formed using a same mask.

9. A liquid crystal display substrate according to claim 1, wherein the gate electrode is made of a material selected from the group consisting of aluminum, aluminum and silicon, tantalum, titanium, copper, palladium, tantalum nitride and titanium nitride.

10. A liquid crystal display substrate according to claim 1, further comprising a chromium layer overlying the highly doped silicon film.

11. A liquid crystal display substrate according to claim 1, wherein the insulating layer includes a first sub-layer which is formed by an anodic conversion of material of the gate electrode, and a second sub-layer on the first sub-layer, the second sub-layer being made of an organic insulating material.

12. A process for fabrication of thin film transistors in active matrix liquid crystal display devices, comprising the steps of:

disposing a gate layer on an insulation substrate;

disposing a gate insulation layer over said gate layer;

disposing a silicon layer over said gate insulation layer;

disposing a contact layer, comprising a highly doped silicon layer, over said silicon layer;

patterning said contact layer, silicon layer, gate insulation layer and gate layer with a same etching mask to form gate electrodes of said thin film transistors, side surfaces of said gate electrodes being exposed;

disposing a side insulation layer to cover the exposed side surfaces of the gate electrodes;

disposing a source and drain conductive layer over said contact layer and said substrate; and patterning said source and drain conductive layer and said contact layer so as to form a source electrode and a drain electrode of said thin film transistors.

13. The fabrication process of claim 12, wherein said gate layer is made of a material selected from the group consisting of aluminum, aluminum and silicon, tantalum, titanium, copper, palladium, nitride of tantalum and nitride of titanium.

14. The fabrication process of claim 13, wherein said side insulation layer comprises an oxide of material of said gate layer.

15. The fabrication process of claim 13, wherein said side insulation layer is formed by anodic conversion of a portion of said gate layer, exposed from said gate insulation layer.

16. Product formed by the process of claim 15.

17. The fabrication process of claim 12, wherein said side insulation layer comprises an organic insulation agent.

18. Product formed by the process of claim 17.

19. Product formed by the process of claim 12.

* * * * *